United States Patent
Mccombe et al.

(10) Patent No.: US 11,792,511 B2
(45) Date of Patent: Oct. 17, 2023

(54) CAMERA SYSTEM UTILIZING AUXILIARY IMAGE SENSORS

(71) Applicants: MINE ONE GmbH, Berlin (DE); James A. Mccombe, San Francisco, CA (US)

(72) Inventors: James A. Mccombe, San Francisco, CA (US); Christoph Birkhold, San Francisco, CA (US)

(73) Assignee: MINE ONE GMBH, Berlin (DE)

( * ) Notice: Subject to any disclaimer, the term of this patent is extended or adjusted under 35 U.S.C. 154(b) by 0 days.

(21) Appl. No.: 17/636,824

(22) PCT Filed: Aug. 20, 2020

(86) PCT No.: PCT/US2020/047276
§ 371 (c)(1),
(2) Date: Feb. 18, 2022

(87) PCT Pub. No.: WO2021/035095
PCT Pub. Date: Feb. 25, 2021

(65) Prior Publication Data
US 2022/0337744 A1   Oct. 20, 2022

Related U.S. Application Data

(63) Continuation-in-part of application No. PCT/US2016/023433, filed on Mar. 21, 2016, and
(Continued)

(51) Int. Cl.
*H04N 23/60* (2023.01)
*H04N 5/073* (2006.01)
(Continued)

(52) U.S. Cl.
CPC ......... *H04N 23/665* (2023.01); *H04N 5/0736* (2013.01); *H04N 23/73* (2023.01); *H04N 23/90* (2023.01); *H04N 23/959* (2023.01)

(58) Field of Classification Search
CPC .... H04N 23/665; H04N 5/0736; H04N 23/73; H04N 23/90; H04N 23/959; H04N 23/662; H04N 5/067
See application file for complete search history.

(56) References Cited

U.S. PATENT DOCUMENTS

| 8,395,629 B1* | 3/2013 | Kilpatrick ............. G06T 15/005 |
| | | 345/643 |
| 2011/0102440 A1* | 5/2011 | Yuen ..................... G06T 15/005 |
| | | 345/428 |

(Continued)

FOREIGN PATENT DOCUMENTS

| CN | 110230983 | 9/2019 |
| CN | 111028155 | 4/2020 |

(Continued)

OTHER PUBLICATIONS

W. Mark et al., "Post-Rendering 3D Warping", Proc. of 1997 Sympos. on Interactive 3D Graphics, Apr. 1997, pp. 7-16 (10 pages).

(Continued)

*Primary Examiner* — Mekonnen D Dagnew
(74) *Attorney, Agent, or Firm* — JACOBS & KIM LLP; David Jacobs

(57) ABSTRACT

Methods, devices, systems and computer software/program code products include techniques for creating a deep frame buffer, such techniques being implementable in conjunction with an apparatus comprising a main camera and an array of buddy cameras, the main camera and the buddy cameras being operable to capture images; and techniques for creat- (Continued)

ing at least one depth buffer, such techniques being implementable in conjunction with an apparatus comprising at least two cameras.

20 Claims, 19 Drawing Sheets

Related U.S. Application Data application No. 17/636,824, which is a continuation-in-part of application No. 17/460,246, filed on Aug. 29, 2021, which is a continuation of application No. 16/749,989, filed on Jan. 22, 2020, now Pat. No. 11,106,275, which is a continuation of application No. 15/560,019, filed on Sep. 20, 2017, now Pat. No. 10,551,913.

(60) Provisional application No. 62/889,490, filed on Aug. 20, 2019, provisional application No. 62/136,494, filed on Mar. 21, 2015.

(51) Int. Cl.
*H04N 23/73* (2023.01)
*H04N 23/90* (2023.01)
*H04N 23/959* (2023.01)

(56) References Cited

U.S. PATENT DOCUMENTS

| | | | |
|---|---|---|---|
| 2011/0187922 A1 | 8/2011 | Hwang | |
| 2012/0099005 A1 | 4/2012 | Kali | |
| 2015/0373316 A1 | 12/2015 | Meng | |
| 2016/0088287 A1 | 3/2016 | Sadi et al. | |
| 2016/0295195 A1 | 10/2016 | Thorn et al. | |
| 2018/0204307 A1* | 7/2018 | Schied | G06V 30/19173 |
| 2019/0304112 A1 | 10/2019 | Hota et al. | |
| 2020/0302682 A1 | 9/2020 | Aksoy et al. | |
| 2020/0320777 A1* | 10/2020 | Meshry | G06T 19/20 |

FOREIGN PATENT DOCUMENTS

| | | |
|---|---|---|
| EP | 3057317 A1 | 8/2016 |
| WO | WO 2016/154123 | 9/2016 |
| WO | WO 2018/164852 | 9/2018 |
| WO | WO 2018/146558 | 11/2018 |

OTHER PUBLICATIONS

Klein et al., "Parallel Tracking and Mapping for Small AR Workspaces", 2007 IEEE ACM Internat. Sympos. on Mixed and Augmented Reality, Nov. 2007, 10 pgs.

Newcombe et al., "DTAM: Dense Tracking and Mapping in Real-Time", 2011 International Conf. on Computer Vision, Nov. 2011, 8 pages.

Wikipedia Article, "Simultaneous Localization & Mapping", retrieved Apr. 2023 from https://en.wikipedia.org/wiki/Simultaneous_localization_and_mapping ; 10 pages.

Brown, "Decentering Distortion of Lenses", Photogrammetric Engineering, 32 (3), 1966, pp. 444-462.

\* cited by examiner

800. METHOD FOR CREATING DEEP FRAME BUFFER
(USING MAIN CAMERA + ARRAY OF BUDDY CAMERAS OPERABLE TO CAPTURE IMAGES):

801. RECEIVE AT LEAST TWO IMAGES FROM THE ARRAY OF BUDDY CAMERAS

802. RECTIFY AND UN-DISTORT BUDDY CAMERA IMAGES INTO AT LEAST ONE COMMON COORDINATE SYSTEM

803. COMPUTE AT LEAST ONE DISPARITY SOLUTION BASED ON THE RECTIFIED AND UNDISTORTED IMAGES

804. RECONSTRUCT A FRAME BUFFER UTILIZING PARAMETER INFORMATION, THE PARAMETER INFORMATION COMPRISING: (I) RELATIVE ORIENTATION INFORMATION RELATING THE MAIN CAMERA TO THE BUDDY CAMERA ARRAY, AND (II) RELATIVE LENS INFORMATION RELATING THE MAIN CAMERA LENS CONFIGURATION TO THE UNDISTORTED BUDDY CAMERA IMAGES

805. MERGE AT LEAST ONE RECONSTRUCTED FRAME BUFFER WITH AT LEAST ONE FRAME BUFFER CAPTURED FROM A MAIN CAMERA.

FIG. 8

900. OPTIONAL ASPECTS OF CREATING DEEP FRAME BUFFER:

(901. PIXELS IN A RECONSTRUCTED FRAME BUFFER HAVE A CORRESPONDENCE WITH PIXELS IN A MAIN CAMERA FRAME BUFFER.)

(902. THE CORRESPONDENCE CAN BE 1 TO 1.)

(903. RECONSTRUCTED FRAME BUFFER COMPRISES DEPTH INFORMATION.)

(904. EXECUTE ADDITIONAL IMAGE EFFECTS, COMPRISING ANY OF: COMPOSITING, LAYER SEPARATION, COMPUTATIONAL FOCUS CHANGE, PERSPECTIVE CHANGE, IMAGE FILTERING, POST PRODUCTION EFFECTS, OR A COMBINATION OF EFFECTS.)

(905. THE RELATIVE ORIENTATION INFORMATION COMPRISES ANY OF: SPATIAL POSITION, ROTATION, COORDINATE SCALE, SPATIAL TRANSLATION, PROJECTION INFORMATION, ADDITIONAL TRANSFORMATION INFORMATION.)

(906. THE RELATIVE ORIENTATION INFORMATION CAN BE CALIBRATED IN ADVANCE OF SYSTEM OPERATION.)

(907. THE RELATIVE LENS INFORMATION COMPRISES A SELECTED COMBINATION OF LENS TYPE, FOCAL LENGTH, FOCAL DISTANCE, PRINCIPAL POINT, PROJECTION, DISTORTION, POLYNOMIAL DISTORTION, TANGENTIAL DISTORTION, CHROMATIC ABERRATION, OR ADDITIONAL LENS CHARACTERIZATION INFORMATION.)

(908. THE RELATIVE LENS INFORMATION IS CALCULATED, IN PART, BASED ON INFORMATION PROVIDED BY SENSORS WITHIN A PHYSICAL LENS ASSEMBLY.)

(909. THE RELATIVE LENS INFORMATION IS CALCULATED, IN PART, BASED ON THE POSITION OF A FOCUS RING.)

(910. THE RELATIVE LENS INFORMATION IS CALCULATED, IN PART, BASED ON THE INPUTS PROVIDED TO AN AUTO-FOCUS SYSTEM.)

(911. THE RELATIVE LENS INFORMATION IS CALCULATED, IN PART, BASED ON A COMPUTATIONAL MODEL OF THE OPTICAL LENS ASSEMBLY.)

(912. THE COMPUTATIONAL MODEL RELATES MULTIPLE PARAMETERS TO EACH OTHER.)

(913. LENS FOCUS MAY BE MODIFIED IN RESPONSE TO CHANGES TO A SELECTED FOCAL LENGTH OR FOCAL DISTANCE.)

(914. THE COMPUTATIONAL MODEL CAN COMPRISE ANY OF MATHEMATICAL FUNCTIONS, LOOK-UP TABLES, OR COMPUTER-EXECUTABLE INSTRUCTIONS.)

NOTE: IN THESE FLOWCHARTS, ELEMENTS IN PARENTHESES ( ) ARE OPTIONAL.

FIG. 9A

900. OPTIONAL ASPECTS OF CREATING DEEP FRAME BUFFER (CONTINUED):

(915. THE COMPUTATIONAL MODEL IS OPERABLE TO ADJUST ANY OF: FOCAL LENGTH, ZOOM, FOCAL DISTANCE, PRINCIPAL POINT, DISTORTION, POLYNOMIAL DISTORTION, TANGENTIAL DISTORTION, CHROMATIC ABERRATION, OR OTHER LENS PARAMETER.)

(916. THE COMPUTATIONAL MODEL IS OPERABLE TO ADJUST ONE OR MORE LENS PARAMETERS IN RESPONSE TO CHANGES TO ANY OF: FOCAL LENGTH, ZOOM, FOCAL DISTANCE, THE FOCUS RING, OR ANY OPERATOR-CONTROLLED PARAMETER, SETTING, OR ADJUSTMENT.)

(917. THE COMPUTATIONAL MODEL RETAINS STATE OVER TIME.)

(918. THE COMPUTATIONAL MODEL COMPRISES INFORMATION ABOUT THE PREVIOUS STATE OF THE MECHANICAL LENS ASSEMBLY IN ADDITION TO ITS THE CURRENT STATE.)

(919. THE PREVIOUS STATE IS USED TO COMPENSATE FOR ANY OF: MECHANICAL SLOP, INTERNAL COMPONENT FLEX, OR IMPRECISE POSITION SENSORS.)

(920. THE COMPUTATIONAL MODEL IS SUPPLIED AT LEAST IN PART BY THE LENS MANUFACTURER.)

(921. THE COMPUTATIONAL MODEL IS CONFIGURED BY MEASURING AN OPTICAL LENS ASSEMBLY IN A VARIETY OF CONFIGURATIONS.)

(922. THE COMPUTATIONAL MODEL IS CONFIGURED BY EXECUTING A CONFIGURATION SEQUENCE THAT EMPLOYS MOTORS WITHIN THE LENS ASSEMBLY TO SWEEP ACROSS A RANGE OF POTENTIAL CONFIGURATIONS.)

(923. THE COMPUTATIONAL MODEL IS CONFIGURED BY OBSERVING ANY OF: A REFERENCE OBJECT, OR TEST PATTERN, AN OBJECT OF KNOWN DIMENSIONS, OR AN OBJECT WITH KNOWN PROPERTIES.)

(924. COMPUTATIONAL MODELS FOR AT LEAST TWO LENS ASSEMBLIES MAY BE MATHEMATICALLY COMBINED TO CREATE A COMPUTATIONAL MODEL FOR A COMBINED LENS ASSEMBLY.)

(925. ANY OF THE RELATIVE ORIENTATION INFORMATION OR THE RELATIVE LENS INFORMATION ARE CALCULATED BASED ON INPUTS FROM SENSORS.)

(926. ANY OF THE RELATIVE ORIENTATION INFORMATION OR THE RELATIVE LENS INFORMATION ARE CALCULATED BASED ON ANALYSIS OF THE BUDDY CAMERA IMAGES AND THE MAIN CAMERA IMAGES.)

(927. THE RECONSTRUCTING COMPRISES ANY OF: A RAY TRACING METHOD, A RAY CASTING METHOD, A RASTERIZATION METHOD, A 2D IMAGE MANIPULATION METHOD, TRIANGLE-BASED METHOD, OR A SCREEN-SPACE TRANSLATION METHOD.)

(928. THE RECONSTRUCTED FRAME BUFFER CONTAINS CHANNELS FOR ANY OF: COLOR INFORMATION, INTENSITY INFORMATION, DISPARITY INFORMATION, DEPTH INFORMATION, CONFIDENCE INFORMATION, INFRARED INFORMATION, OBJECT IDENTIFICATION INFORMATION, TEXTURE INFORMATION, MATERIAL INFORMATION, LIGHTING INFORMATION, OR ADDITIONAL INFORMATION.)

FIG. 9B

1000. METHOD FOR CREATING AT LEAST ONE DEPTH BUFFER (USING AT LEAST TWO CAMERAS):

1001. CAPTURE, THROUGH THE AT LEAST TWO CAMERAS, IMAGES CORRESPONDING TO AT LEAST TWO SUBSTANTIALLY SIMILAR VIEWS OF A SCENE;

1002. RECTIFY AND UN-DISTORT THE IMAGES INTO AT LEAST ONE COMMON COORDINATE SYSTEM;

1003. COMPUTE AT LEAST ONE DISPARITY SOLUTION BASED ON THE RECTIFIED AND UNDISTORTED IMAGES

1004. COMPUTE AT LEAST ONE BUFFER OF DEPTH VALUES FROM THE DISPARITY SOLUTIONS AND THE RELATIVE SPATIAL POSITIONS OF THE CAMERAS.

FIG. 10

1100. OPTIONAL ASPECTS OF CREATING AT LEAST ONE DEPTH BUFFER:

(1101. RECONSTRUCTING A DEPTH BUFFER FROM A VIRTUAL CAMERA LOCATION WITHIN THE COMMON COORDINATE SYSTEM.)

(1102. THE VIRTUAL CAMERA LOCATION CORRESPONDS TO THE LOCATION OF A PHYSICAL MAIN CAMERA.)

(1103. ELEMENTS OF THE COMPUTED DEPTH BUFFER HAVE A DIRECT CORRESPONDENCE WITH PIXEL ELEMENTS OF A FRAME BUFFER OF THE MAIN CAMERA.)

(1104. AT LEAST ONE CAMERA COMPRISES RELATIVELY INEXPENSIVE CAMERA MODULES SUCH AS A CELL PHONE CAMERA MODULE.)

(1105. AT LEAST ONE OF THE CAMERAS IS A CAMERA OF HIGH QUALITY, WITH AN ADJUSTABLE LENS.)

(1106. THE RECTIFICATION AND UN-DISTORTION IS PERFORMED BASED A COMPUTATIONAL MODEL OF A PHYSICAL LENS.)

FIG. 11

1200. METHOD OF CONFIGURING A CAMERA/IMAGING SYSTEM:

1201. PROVIDE AT LEAST ONE MAIN CAMERA SENSOR OPERABLE TO CAPTURE HIGH QUALITY IMAGES

1202. PROVIDE AT LEAST ONE ADJUSTABLE MAIN CAMERA LENS ASSEMBLY OPERABLE TO BE CONFIGURED BY A CAMERA OPERATOR

1203. PROVIDE AT LEAST ONE BUDDY CAMERA SENSOR CONFIGURED SO AS TO HAVE A PERSPECTIVE OF A SCENE THAT IS SUBSTANTIALLY SIMILAR TO A PERSPECTIVE OF THE SCENE OF THE MAIN CAMERA

1204. PROVIDE AT LEAST ONE CORRESPONDENCE PROCESSING MODULE, CONFIGURED SO THAT IMAGES FROM AT LEAST ONE BUDDY CAMERA MAY BE UTILIZED AS AN INPUT TO A STEREO CORRESPONDENCE SEARCH OPERATION EXECUTABLE BY THE AT LEAST ONE CORRESPONDENCE PROCESSING MODULE

1205. PROVIDE AT LEAST ONE RECONSTRUCTION PROCESSING MODULE, CONFIGURED TO RECONSTRUCT AT LEAST ONE FRAME BUFFER FROM A SELECTED VIEWPOINT.

FIG. 12

1300. OPTIONAL ASPECTS OF CONFIGURING CAMERA/IMAGING SYSTEM:

(1301. OPERATIONS OF THE AT LEAST ONE CORRESPONDENCE PROCESSING MODULE AND OPERATIONS OF THE AT LEAST ONE RECONSTRUCTION PROCESSING MODULE ARE PERFORMED BY THE SAME PROCESSING RESOURCE.)

(1302. THE RECONSTRUCTION PROCESSING MODULE RECONSTRUCTS DEPTH DATA.)

(1303. THE SYSTEM IS FURTHER CONFIGURED TO MERGE A RECONSTRUCTED FRAME BUFFER WITH A FRAME BUFFER CAPTURED FROM A MAIN CAMERA SENSOR.)

(1304. THE AT LEAST ONE BUDDY CAMERA SENSOR IS AN INEXPENSIVE CAMERA SENSOR SUCH AS A CELL PHONE CAMERA MODULE.)

(1305. THE SYSTEM COMPRISES ONE MAIN CAMERA AND AN ARRAY OF BUDDY CAMERAS.)

(1306. THE SYSTEM COMPRISES ONE MAIN CAMERA AND ONE BUDDY CAMERA.)

(1307. AT LEAST TWO BUDDY CAMERAS ARE MOUNTED TOGETHER ON A SUBSTANTIALLY RIGID ELEMENT.)

(1308. A CONFIGURATION SEQUENCE CAN BE EXECUTED TO UPDATE ANY CONFIGURATION INFORMATION THAT MAY HAVE BECOME INACCURATE IN RESPONSE TO PHYSICAL CHANGES, MECHANICAL SHOCKS, ENVIRONMENTAL CHANGES, OR MECHANICAL WEAR.)

(1309. THE RECONSTRUCTED DATA IS DISPLAYED ON AN ELECTRONIC VIEWFINDER.)

(1310. PRE-VISUALIZATION EFFECTS ARE DISPLAYED ON AN ELECTRONIC VIEWFINDER.)

(1311. AN AUTOFOCUS MOTOR IS CONTROLLED BY AN ELECTRONIC SYSTEM, THE ELECTRONIC SYSTEM RECEIVING DEPTH INFORMATION AS AN INPUT PARAMETER.)

FIG. 13

1400. ADDITIONAL/OPTIONAL ASPECTS OF CONFIGURING CAMERA/IMAGING SYSTEM (1401. AT LEAST ONE RECONSTRUCTION PROCESSING MODULE IS CONFIGURED TO RECONSTRUCT AT LEAST ONE FRAME BUFFER FROM AT LEAST ONE VIEWPOINT DIFFERENT FROM THE SELECTED VIEWPOINT, FROM THE SAME CAPTURED IMAGES.)

(1402. THE SELECTED VIEWPOINT IS A VIEWPOINT CORRESPONDING TO THE VIEWPOINT OF A MAIN CAMERA.)

(1403. AT LEAST ONE VIEWPOINT CORRESPONDS TO A VIEWER'S PERSPECTIVE AS INDICATED BY A VIEWING DEVICE.)

(1404. THE VIEWING DEVICE IS A HEAD MOUNTED DISPLAY (HMD).)

(1405. THE SYSTEM COMPRISES A STORAGE RESOURCE OPERABLE TO STORE ANY OF CAPTURED IMAGE DATA, CAMERA CONFIGURATION DATA, IMAGE CORRESPONDENCE DATA, OR DEEP FRAME BUFFER DATA USEABLE IN RECONSTRUCTION OF AT LEAST ONE FRAME BUFFER CORRESPONDING TO AT LEAST ONE VIEWPOINT DIFFERENT FROM THE SELECTED VIEWPOINT.)

(1406. THE SYSTEM COMPRISES A TRANSMITTING RESOURCE OPERABLE TO TRANSMIT ANY OF CAPTURED IMAGE DATA, CAMERA CONFIGURATION DATA, IMAGE CORRESPONDENCE DATA, OR DEEP FRAME BUFFER DATA USEABLE IN RECONSTRUCTION OF AT LEAST ONE FRAME BUFFER IN A LOCATION SEPARATE FROM THAT OF THE MAIN CAMERA SENSOR.)

(1407. AT LEAST ONE BUDDY CAMERA SENSOR IS A MONOCHROME SENSOR.)

(1408. AT LEAST ONE BUDDY CAMERA SENSOR DOES NOT UTILIZE A BAYER FILTER OR OTHER COLOR FILTER.)

(1409. AT LEAST ONE BUDDY CAMERA SENSOR IS SENSITIVE TO INFRARED (IR) LIGHT.)

(1410. AT LEAST ONE BUDDY CAMERA SENSOR DOES NOT UTILIZE AN INFRARED (IR) OR NEAR-IR FILTER.)

(1411. THE SYSTEM COMPRISES AT LEAST ONE INFRARED (IR) LIGHT EMITTER POSITIONED TO ILLUMINATE THE SCENE AND IMPROVE VISIBILITY OF SCENE ELEMENTS TO AT LEAST ONE BUDDY CAMERA.)

(1412. THE SYSTEM COMPRISES SHUTTER SYNCHRONIZATION LOGIC OPERABLE TO SYNCHRONIZE CAPTURE OF IMAGES BY AT LEAST ONE BUDDY CAMERA AND AT LEAST ONE MAIN CAMERA.)

(1413. THE SHUTTER SYNCHRONIZATION LOGIC IS RESPONSIVE TO A CONTROL SIGNAL FROM A MASTER CAMERA.)

(1414. THE SHUTTER SYNCHRONIZATION LOGIC IS RESPONSIVE TO A COMMON CONTROL SIGNAL.)

FIG. 14A

1400. ADDITIONAL/OPTIONAL ASPECTS OF CONFIGURING CAMERA/IMAGING SYSTEM (CONTINUED):

(1415. THE SHUTTER SYNCHRONIZATION LOGIC IS RESPONSIVE TO AT LEAST ONE CLOCK ELEMENT.)

(1416. CLOCK ELEMENTS ARE SYNCHRONIZED VIA A SYNCHRONIZATION SIGNAL.)

(1417. THE SYNCHRONIZATION SIGNAL IS GENERATED BY ANY OF A NETWORK ELEMENT, A GPS ELEMENT, OR OTHER SYNCHRONIZATION ELEMENT.)

(1418. CLOCK ELEMENTS ARE CONFIGURED VIA A CONFIGURATION SIGNAL..)

(1419. THE CONFIGURATION SIGNAL COMPRISES CONFIGURATION INFORMATION.)

(1420. THE CONFIGURATION INFORMATION COMPRISES INSTRUCTIONS TO OPERATE AT LEAST ONE SHUTTER AT A SELECTED TIME INTERVAL.)

(1421. THE CONFIGURATION SIGNAL IS GENERATED BY ANY OF A NETWORK ELEMENT, A GPS ELEMENT, OR OTHER CONFIGURATION ELEMENT.)

(1422. ANY OF THE CONTROL SIGNAL, SYNCHRONIZATION SIGNAL OR CONFIGURATION SIGNAL ARE TRANSMITTED VIA A TRANSMISSION MEDIUM.)

(1423. THE TRANSMISSION MEDIUM COMPRISES ANY OF A DIGITAL COMPUTER NETWORK, A WIFI NETWORK, A BLUETOOTH NETWORK, A RADIO SIGNAL, OR A GPS SIGNAL.)

(1424. THE SYSTEM IS OPERABLE TO TRANSMIT A STREAM OF FRAME BUFFER DATA VIA A COMMUNICATIONS CONNECTION, UTILIZING A SELECTED TRANSMISSION OR STREAMING PROTOCOL.)

(1425. THE STREAM IS VIEWABLE ON A SELECTED VIEWING DEVICE.)

(1426. THE VIEWING DEVICE COMPRISES ANY OF A SMARTPHONE, TABLET COMPUTER, LAPTOP COMPUTER, EXTERNAL MONITOR, OR HEAD MOUNTED DEVICE (HMD).)

(1427. THE COMMUNICATIONS CONNECTION COMPRISES AN ANALOG COMMUNICATIONS MEDIUM.)
(1428. THE COMMUNICATIONS CONNECTION COMPRISES A DIGITAL NETWORK.)

(1429. THE ANALOG COMMUNICATIONS MEDIUM COMPRISES RADIO TRANSMISSION.)
(1430. THE DIGITAL NETWORK COMPRISES ANY OF WIRED OR WIRELESS COMMUNICATIONS LINKS.)

(1431. THE SYSTEM COMPRISES FOCUS ADJUSTMENT LOGIC OPERABLE TO ADJUST FOCUS IN RESPONSE TO A CHANGE IN LENS ZOOM.)

(1432. AT LEAST ONE BUDDY CAMERA IS HOUSED IN ASSOCIATION WITH A REMOVABLE ACCESSORY STRUCTURE SELECTIVELY ASSOCIATABLE WITH THE MAIN CAMERA.)

FIG. 14B

1400. ADDITIONAL/OPTIONAL ASPECTS OF CONFIGURING CAMERA/IMAGING SYSTEM (CONTINUED):

(1433. THE SYSTEM COMPRISES AT LEAST ONE IMAGE PROCESSING MODULE OPERABLE TO RECTIFY AND UNDISTORT, INTO THE SAME COMMON COORDINATE SYSTEM, ANY OF: IMAGES CAPTURED BY A MAIN CAMERA AND IMAGES CAPTURED BY A BUDDY CAMERA.)

(1434. OPERATIONS OF THE IMAGE PROCESSING MODULE ARE RESPONSIVE AT LEAST IN PART TO A LENS CONFIGURATION OF AT LEAST ONE MAIN CAMERA.)

(1435. THE IMAGE PROCESSING MODULE IS CONFIGURED TO EXECUTE AT LEAST ONE COMPUTATIONAL OPERATION CORRESPONDING TO THE COMPUTATIONAL INVERSE OF A PHYSICAL OPERATION OF AT LEAST ONE MAIN CAMERA LENS.)

(1436. AT LEAST ONE CORRESPONDENCE PROCESSING MODULE RECEIVES IMAGES CAPTURED BY A MAIN CAMERA AND IMAGES CAPTURED BY A BUDDY CAMERA.)

(1437. COMPUTER GENERATED (CG) EFFECTS ARE DISPLAYED ON AN ELECTRONIC VIEWFINDER, AND WHEREIN THE CG EFFECTS COMPRISE ANY OF CG CHARACTERS, SCENE ELEMENTS OR BACKGROUNDS.)

(1438. PLACEHOLDER MARKERS ARE DISPLAYED ON THE ELECTRONIC VIEWFINDER, TO INDICATE WHERE COMPUTER GENERATED (CG) EFFECTS WILL SUBSEQUENTLY BE MADE VISIBLE TO SUBSEQUENT USER.)

(1439. DATA FROM A RECONSTRUCTED FRAME BUFFER IS USED TO PROVIDE REAL-TIME FEEDBACK TO A USER OF THE SYSTEM, AND WHEREIN THE USER IS REMOTE FROM THE MAIN CAMERA.)

(1440. COMPUTER GENERATED (CG) EFFECTS ARE CONFIGURED TO BE RESPONSIVE TO LIVE ACTORS, WHOSE IMAGES ARE BEING CAPTURED BY ANY OF THE MAIN CAMERA OR AT LEAST ONE BUDDY CAMERA, IN REAL-TIME, USING DATA FROM A RECONSTRUCTED FRAME BUFFER.)

(1441. THE ELECTRONIC SYSTEM THAT CONTROLS THE AUTOFOCUS MOTOR SEEKS TO FOCUS AT A SELECTED FOCUS DEPTH.)

(1442. THE ELECTRONIC SYSTEM THAT CONTROLS THE AUTOFOCUS MOTOR COMPRISES LOGIC OPERABLE TO ANTICIPATE THE RESPONSE OF ANY OF THE AUTOFOCUS MOTOR OR PHYSICAL LENS CONTROL ELEMENTS.)

(1443. THE SYSTEM COMPRISES AT LEAST ONE IMAGE PROCESSING MODULE CONFIGURED TO IDENTIFY AT LEAST ONE OBJECT WITHIN THE IMAGE AND CONTROL THE AUTOFOCUS ELECTRONIC SYSTEM TO MAINTAIN A DESIRED FOCUS BASED ON IDENTIFICATION OF THE OBJECT.)

(1444. AT LEAST ONE OBJECT COMPRISES A FACE, AND THE IMAGE PROCESSING MODULE EXECUTES A FACIAL RECOGNITION OPERATION.)

CAMERA SYSTEM UTILIZING AUXILIARY IMAGE SENSORS

CROSS-REFERENCE TO RELATED APPLICATIONS AND INCORPORATION BY REFERENCE

This patent application claims the priority benefit of U.S. Provisional Pat. App. 62/889,490 filed 20 Aug. 2019, incorporated by reference herein.

This patent application is also a continuation-in-part (CIP) of commonly owned PCT Pat. App. PCT/US16/23433 entitled "Virtual 3D Methods, Systems And Software", published as WO/2016/154123, which claims the priority benefit of U.S. Provisional Pat. App. U.S. Ser. No. 62/136,494; and is a CIP of U.S. patent application Ser. No. 15/560,019 (now U.S. Pat. No. 10,551,913), which is a U.S. national entry of above-noted PCT/US16/23433). Each of the foregoing applications is incorporated by reference herein.

This patent application is also a CIP of commonly owned U.S. patent application Ser. No. 16/749,989, which is a continuation of U.S. patent application Ser. No. 15/560,019, each of which is incorporated by reference herein. This patent application is also related to the following commonly owned PCT patent applications, which are incorporated herein by reference:

PCT/US16/32213 entitled "Facial Signature Methods, Systems and Software", published as WO/2016/183380;

PCT/US18/19243 entitled "Image Reconstruction For Virtual 3D", published as WO/2018/164852;

PCT/US18/63699 entitled "Stereo Correspondence Search", published as WO/2019/109106;

PCT/US18/48197 entitled "Visual Communications Methods, Systems And Software", published as WO/2019/067134;

PCT/US18/63531 entitled "Temporal De-Noising", published as WO/2019/109061; and

PCT/US18/64077 entitled "Disparity Cache", published as WO/2019/113215.

Each of the above-listed applications is incorporated by reference herein as if set forth herein in its entirety, including all text and drawings thereof.

In the event of an inconsistent description between this document and any of the documents incorporated by reference, the description in the incorporated document(s) shall be considered merely supplementary to the description set forth herein, and the description set forth herein shall control.

BACKGROUND OF THE INVENTION

Existing professional-grade camera systems for still and moving photography typically utilize a single high-quality main image sensor. Alternatively, photographic film is still commonly used. These systems also incorporate precise optical lenses. Manual and semi-manual focus is usually a feature of these camera systems. In some systems, the focal length of the lens may be changed. In some systems, the lenses may be swapped for lenses with different specifications. Such conventional systems are designed to provide control, familiarity, and artistic freedom to a photographer or cinematographer.

In some systems, viewfinder functionality is enabled using an auxiliary sight or rangefinder, but typical modern camera systems attempt to utilize the same light path for the viewfinder and the photographic element. Professional camera systems often feature both an optical viewfinder as well as an electronic viewfinder.

In addition, motion picture cameras systems often contain a microphone, in order to record sound that is synchronized to captured video or film. An example of such a prior-art configuration is shown in the schematic diagram of FIG. 1, which shows the elements of a conventional high-end (i.e., high-quality) camera system 101, such as may be used in producing motion pictures. The configuration shown in FIG. 1 utilizes a single main camera, comprising a high-quality image sensor housed in a camera body 102. The main camera further includes a lens 103 with a lens hood 104, a microphone 105, an electronic viewfinder 106, and an optical viewfinder 107.

The commonly-owned patent applications listed above and incorporated by reference herein disclose, among other aspects, how two or more image sensors viewing similar (but different) perspectives of a scene may be used to create rich pixel information, including per-pixel disparity information and per-pixel depth information. See, for example, the above-listed, commonly owned PCT/US16/23433 (hereinafter "V3D application") and PCT/US18/19243 (hereinafter "Reconstructor application") The above-listed applications also disclose how this information may be used to reconstruct another, alternative view (or views) of the scene from the perspective of a virtual viewpoint where no physical image sensor was located.

It would be desirable, in order to enable various additional functionalities, such as computational photography, beyond those possible using a single image sensor, to provide camera systems, configurations and devices that utilize auxiliary image sensors in addition to a main image sensor.

The present invention enables the foregoing aspects, and others.

Although embodiments and practices of the present invention discussed herein can be used in conjunction with practices and embodiments of the Virtual 3-D ("V3D") inventions described in the above-noted, commonly-owned patent applications incorporated herein by reference, they may also be useful in other systems and in connection with other technologies, and are not limited to application in connection with the V3D inventions described in the patent applications incorporated by reference herein.

Aspects, examples, embodiments and practices of the invention, whether in the form of methods, devices, systems or computer software/program code products, will next be described in greater detail in the following Detailed Description of the Invention, in conjunction with the attached drawing figures.

Those skilled in the art will appreciate that while the following detailed description provides sufficient detail to enable one skilled in the art to practice the present invention, the various examples, embodiments and practices of the present invention that are discussed and described below, in conjunction with the attached drawing figures, are provided by way of example, and not by way of limitation. Numerous variations, additions, and other modifications or different implementations of the present invention are possible, and are within the spirit and scope of the invention.

SUMMARY OF THE INVENTION

One aspect of the present invention relates to a method for creating a deep frame buffer, the method being implementable in conjunction with an apparatus comprising a main camera and an array of buddy cameras, the main camera and the buddy cameras being operable to capture images, and the method comprising: (A.) receiving at least two images from the array of buddy cameras; (B.) rectifying and un-distorting the buddy camera images into at least one common coordinate system; (C.) computing at least one disparity solution based on the rectified and undistorted images; (D.) reconstructing a frame buffer utilizing parameter information, the parameter information comprising: (i) relative orientation information relating the main camera to the buddy camera array, and (ii) relative lens information relating the main camera lens configuration to the undistorted buddy camera images; and (E.) merging at least one reconstructed frame buffer with at least one frame buffer captured from a main camera.

In a related aspect of the invention, pixels in a reconstructed frame buffer have a correspondence with pixels in a main camera frame buffer.

In another aspect of the invention, the correspondence is 1 to 1.

In yet another aspect, the reconstructed frame buffer comprises depth information.

Another aspect of the invention further comprises executing additional image effects, the effects comprising any of: compositing, layer separation, computational focus change, perspective change, image filtering, post production effects, or a combination of effects.

In another aspect, the relative orientation information comprises any of: spatial position, rotation, coordinate scale, spatial translation, projection information, additional transformation information.

The relative orientation information can be calibrated in advance of system operation.

In another aspect, the relative lens information comprises a selected combination of lens type, focal length, focal distance, principal point, projection, distortion, polynomial distortion, tangential distortion, chromatic aberration, or additional lens characterization information.

In a further aspect, the relative lens information is calculated, in part, based on information provided by sensors within a physical lens assembly.

In yet another aspect, the relative lens information is calculated, in part, based on the position of a focus ring.

In another aspect, the relative lens information is calculated, in part, based on the inputs provided to an auto-focus system.

In a further aspect of the invention, the relative lens information is calculated, in part, based on a computational model of the optical lens assembly.

In another aspect, the computational model relates multiple parameters to each other.

In yet another aspect, lens focus may be modified in response to changes to a selected focal length or focal distance.

In another aspect of the present invention, the computational model comprises any of mathematical functions, look-up tables, or computer-executable instructions.

In another aspect, the computational model is operable to adjust any of: focal length, zoom, focal distance, principal point, distortion, polynomial distortion, tangential distortion, chromatic aberration, or other lens parameter.

In a further aspect of the invention, the computational model is operable to adjust one or more lens parameters in response to changes to any of: focal length, zoom, focal distance, the focus ring, or any operator-controlled parameter, setting, or adjustment.

In another aspect, the computational model retains state over time.

In still another aspect of the invention, the computational model comprises information about the previous state of the mechanical lens assembly in addition to its the current state.

In another aspect, the previous state is used to compensate for any of: mechanical slop, internal component flex, or imprecise position sensors.

In another aspect, the computational model is supplied at least in part by the lens manufacturer.

In yet another aspect of the present invention, the computational model is configured by measuring an optical lens assembly in a variety of configurations.

In another aspect, the computational model is configured by executing a configuration sequence that employs motors within the lens assembly to sweep across a range of potential configurations.

In another aspect of the invention, the computational model is configured by observing any of: a reference object, or test pattern, an object of known dimensions, or an object with known properties.

In a further aspect, computational models for at least two lens assemblies may be mathematically combined to create a computational model for a combined lens assembly.

In yet another aspect of the present invention, any of the relative orientation information or the relative lens information are calculated based on inputs from sensors.

In another aspect, any of the relative orientation information or the relative lens information are calculated based on analysis of the buddy camera images and the main camera images.

In still a further aspect of the invention, the reconstructing comprises any of: a ray tracing method, a ray casting method, a rasterization method, a 2D image manipulation method, triangle-based method, or a screen-space translation method.

In another aspect, the reconstructed frame buffer contains channels for any of: color information, intensity information, disparity information, depth information, confidence information, infrared information, object identification information, texture information, material information, lighting information, or additional information.

One aspect of the present invention relates to a method for creating at least one depth buffer, the method being implementable in conjunction with an apparatus comprising at least two cameras, the method comprising: (A.) capturing, through the at least two cameras, images corresponding to at least two substantially similar views of a scene; (B.) rectifying and un-distorting the images into at least one common coordinate system; (C.) computing at least one disparity solution based on the rectified and undistorted images; and (D.) computing at least one buffer of depth values from the disparity solutions and the relative spatial positions of the cameras.

A related aspect of the invention comprises reconstructing a depth buffer from a virtual camera location within the common coordinate system.

In another aspect, the virtual camera location corresponds to the location of a physical main camera.

In yet another aspect, elements of the computed depth buffer have a direct correspondence with pixel elements of a frame buffer of the main camera.

In another aspect, at least one camera comprises relatively inexpensive camera modules such as a cell phone camera module.

In another aspect, at least one of the cameras is a camera of high quality, with an adjustable lens.

In another aspect of the invention, the rectification and un-distortion is performed based a computational model of a physical lens.

One aspect of the present invention relates to a camera system comprising: (A.) at least one main camera sensor operable to capture high quality images; (B.) at least one adjustable main camera lens assembly operable to be configured by a camera operator; (C.) at least one buddy camera sensor configured so as to have a perspective of a scene that is substantially similar to a perspective of the scene of the main camera; (D.) at least one correspondence processing module, configured so that images from at least one buddy camera may be utilized as an input to a stereo correspondence search operation executable by the at least one correspondence processing module; and (E.) at least one reconstruction processing module, configured to reconstruct at least one frame buffer from a selected viewpoint. That viewpoint can be a viewpoint corresponding to the viewpoint of a main camera.

In a related aspect, the at least one reconstruction processing module is configured to reconstruct at least one frame buffer from at least one viewpoint different from the selected viewpoint, from the same captured images.

In another aspect, at least one viewpoint corresponds to a viewer's perspective as indicated by a viewing device.

In a related aspect, the viewing device is a head mounted display (HMD).

In another aspect, the system further comprises a digital storage resource operable to store any of captured image data, camera configuration data, image correspondence data, or deep frame buffer data useable in reconstruction of at least one frame buffer corresponding to at least one viewpoint different from the selected viewpoint.

In another aspect, the system further comprises a transmitting or transmission resource operable to transmit any of captured image data, camera configuration data, image correspondence data, or deep frame buffer data useable in reconstruction of at least one frame buffer in a location separate from that of the main camera sensor In a related aspect, operations of the at least one correspondence processing module and operations of the at least one reconstruction processing module are performed by the same processing resource.

In another aspect, the reconstruction processing module reconstructs depth data.

In a further aspect of the invention, the system is further configured to merge a reconstructed frame buffer with a frame buffer captured from a main camera sensor.

In another aspect, the at least one buddy camera sensor is an inexpensive camera sensor such as a cell phone camera module.

In another aspect of the invention, at least one buddy camera sensor is a monochrome sensor.

In another aspect, at least one buddy camera sensor does not utilize a Bayer filter or other color filter.

In another aspect of the invention, at least one buddy camera sensor is sensitive to infrared (IR) light.

In another aspect, at least one buddy camera sensor does not utilize an infrared (IR) or near-IR filter.

In another aspect of the invention, the system further comprises at least one infrared (IR) light emitter positioned to illuminate the scene and improve visibility of scene elements to at least one buddy camera.

In another aspect of the invention, the system further comprises shutter synchronization logic operable to synchronize capture of images by at least one buddy camera and at least one main camera.

In a related aspect, the shutter synchronization logic is responsive to a control signal from a master camera.

In another aspect, the shutter synchronization logic is responsive to a common control signal.

In a further aspect, the shutter synchronization logic is responsive to at least one clock element.

In another aspect of the invention, clock elements are synchronized via a synchronization signal.

In still another aspect, the synchronization signal is generated by any of a network element, a GPS element, or other synchronization element.

In another aspect of the invention, clock elements are configured via a configuration signal.

In another aspect, the configuration signal comprises configuration information.

In a further aspect of the invention, the configuration information comprises instructions to operate at least one shutter at a selected time interval.

In another aspect, the configuration signal is generated by any of a network element, a GPS element, or other configuration element.

In a related aspect of the invention, any of the control signal, synchronization signal or configuration signal are transmitted via a transmission medium.

In a further related aspect, the transmission medium comprises any of a digital computer network, a WiFi network, a Bluetooth network, a radio signal, or a GPS signal.

In another aspect of the invention, the system is operable to transmit a stream of frame buffer data via a communications connection, utilizing a selected transmission or streaming protocol.

In another aspect, the stream is viewable on a selected viewing device.

In a related aspect of the invention, the viewing device comprises any of a smartphone, tablet computer, laptop computer, or external monitor, external display or head mounted display (HMD).

In another aspect, the communications connection comprises an analog communications medium.

In a related aspect, the communications connection comprises a digital network.

In another aspect of the invention, the analog communications medium comprises radio transmission.

In another aspect of the invention, the digital network comprises any of wired or wireless communications links.

In another aspect of the invention, the system further comprises focus adjustment logic operable to adjust focus in response to a change in lens zoom.

In another aspect of the invention, the system comprises one main camera and an array of buddy cameras.

In another aspect, the system comprises one main camera and one buddy camera.

In yet another aspect, at least two buddy cameras are mounted together on a substantially rigid element.

In another aspect, at least one buddy camera is housed in association with a removable accessory structure selectively associatable with the main camera.

In another aspect of the invention, a configuration sequence may be executed to update any configuration information that may have become inaccurate in response to physical changes, mechanical shocks, environmental changes, or mechanical wear.

In still another aspect of the invention, the system further comprises at least one image processing module operable to rectify and undistort, into the same common coordinate system, any of: images captured by a main camera and images captured by a buddy camera.

In another aspect of the invention, operations of the image processing module are responsive at least in part to a lens configuration of at least one main camera.

In another aspect, the image processing module is configured to execute at least one computational operation corresponding to the computational inverse of a physical operation of at least one main camera lens.

In yet another aspect of the invention, at least one correspondence processing module receives images captured by a main camera and images captured by a buddy camera.

In another aspect, the reconstructed data is displayed on an electronic viewfinder.

In still another aspect, pre-visualization effects are displayed on an electronic viewfinder.

In a further aspect of the invention, computer generated (CG) effects are displayed on the electronic viewfinder, and wherein the CG effects comprise any of CG characters, scene elements or backgrounds.

In another aspect of the invention, placeholder markers are displayed on the electronic viewfinder, to indicate where computer generated (CG) effects will subsequently be made visible to a subsequent viewer.

In still another aspect, data from a reconstructed frame buffer is used to provide real-time feedback to a user of the system, and wherein the user is remote from the main camera.

In yet another aspect of the invention, computer generated (CG) effects are configured to be responsive to live actors, whose images are being captured by any of the main camera or the at least one buddy camera, in real-time, using data from a reconstructed frame buffer.

In another aspect, an autofocus motor is controlled by an electronic system, the electronic system receiving depth information as an input parameter.

In a further aspect of the invention, the electronic system seeks to focus at a selected focus depth; instead of seeking to optimize the sharpness of a region of the image.

In another aspect of the invention, the electronic system comprises logic operable to anticipate the response of any of the autofocus motor or physical lens control elements; to enable faster focusing and reduce "overshooting".

Another aspect of the invention comprises at least one image processing module configured to identify at least one object within the image and control the electronic system to maintain a desired focus based on identification of the object.

In a further aspect of the invention, at least one object comprises a face, and the image processing module executes a facial recognition operation.

One aspect of the present invention relates to a system operable to create a deep frame buffer, the system comprising: a main camera and an array of buddy cameras, the main camera and the buddy cameras being operable to capture images; and a digital processing resource comprising at least one digital processor, the digital processing resource being operable to: (A.) receive at least two images from the array of buddy cameras; (B.) rectify and un-distort the buddy camera images into one or more common coordinate systems; (C.) compute at least one disparity solution based on the rectified and undistorted images; (D.) reconstruct a frame buffer utilizing parameter information, the parameter information comprising: (i) relative orientation information relating the main camera to the buddy camera array, and (ii) relative lens information relating the main camera lens configuration to the undistorted buddy camera images; and (E.) merge at least one reconstructed frame buffer with at least one frame buffer captured from a main camera.

Another aspect of the present invention relates to a system operable to create at least one depth buffer, the system comprising: at least two cameras, operable to capture images corresponding to at least two substantially similar views of a scene; and a digital processing resource comprising at least one digital processor, the digital processing resource being operable to: (A.) rectify and un-distort the images into at least one common coordinate system; (B.) compute at least one disparity solution based on the rectified and undistorted images; and (C.) compute at least one buffer of depth values from the disparity solutions and the relative spatial positions of the cameras.

One practice of the present invention relates to a method of configuring a camera system, the method comprising: (A.) providing at least one main camera sensor operable to capture high quality images; (B.) providing at least one adjustable main camera lens assembly operable to be configured by a camera operator; (C.) providing at least one buddy camera sensor configured so as to have a perspective of a scene that is substantially similar to a perspective of the scene of the main camera; (D.) providing at least one correspondence processing module, configured so that images from at least one buddy camera may be utilized as an input to a stereo correspondence search operation executable by the at least one correspondence processing module; and (E.) providing at least one reconstruction processing module, configured to reconstruct at least one frame buffer from a selected viewpoint. In a related aspect of the invention, that viewpoint corresponds to the viewpoint of a main camera.

One aspect of the present invention relates to a non-transitory digital processor-readable medium useable in a digital processing system, the digital processing system comprising at least one digital processor and operable to receive images from an apparatus comprising a main camera and an array of buddy cameras, the main camera and the buddy cameras being operable to capture images, the digital processor-readable medium comprising digital processor-executable program instructions, which, when executed in the digital processing system, cause the digital processing system to execute a method for creating a deep frame buffer, the method comprising: (A.) receiving at least two images from the array of buddy cameras; (B.) rectifying and un-distorting the buddy camera images into at least one common coordinate system; (C.) computing at least one disparity solution based on the rectified and undistorted images; (D.) reconstructing a frame buffer utilizing parameter information, the parameter information comprising: (i) relative orientation information relating the main camera to the buddy camera array, and (ii) relative lens information relating the main camera lens configuration to the undistorted buddy camera images; and (E.) merging at least one reconstructed frame buffer with at least one frame buffer captured from a main camera.

Another aspect of the present invention relates to a non-transitory digital processor-readable medium useable in a digital processing system, the digital processing system comprising at least one digital processor and being operable to receive images from an apparatus comprising at least two cameras, the at least two cameras being operable to capture images, the digital processor-readable medium comprising digital processor-executable program instructions, which, when executed in the digital processing system, cause the digital processing system to execute a method for creating at least one frame buffer, the method comprising: (1) receiving, from the at least two cameras, captured images corresponding to at least two substantially similar views of a scene; (2) rectifying and un-distorting the images into at least one common coordinate system; (3) computing at least one disparity solution based on the rectified and undistorted images; and (4) computing at least one buffer of depth values from the disparity solutions and the relative spatial positions of the cameras.

A further aspect of the invention relates to a non-transitory digital processor-readable medium useable in a digital processing system, the digital processing system comprising at least one digital processor and being operable to receive images from a camera system comprising (A) at least one main camera sensor operable to capture high quality images; (B) at least one adjustable main camera lens assembly operable to be configured by a camera operator; and (C) at least one buddy camera sensor configured to have a perspective of a scene that is substantially similar to a perspective of the scene of the main camera; the digital processor-readable medium comprising digital processor-executable program instructions, which, when executed in the digital processing system, cause the digital processing system to execute a method of reconstructing a frame buffer from a viewpoint corresponding to the viewpoint of the main camera, the method comprising: (1) configuring at least one correspondence processing module in the digital processing system to be operable such that images from at least one buddy camera are utilized as an input to a stereo correspondence search operation executable by the at least one correspondence processing module; and (2) configuring at least one reconstruction processing module in the digital processing system to reconstruct at least one frame buffer from a selected viewpoint. In a related aspect of the invention, that viewpoint corresponds to the viewpoint of a main camera.

These and other aspects, examples, embodiments and practices of the invention, whether in the form of methods, devices, systems or computer software/program code products, will be discussed in greater detail below in the following Detailed Description of the Invention and in connection with the attached drawing figures.

In the aspects of the invention described herein, the image processing methods described are executable by digital processors, which can include graphics processor units (GPUs), including general purpose graphics processor units (GPGPUs) such as those commercially available on cellphones, smartphones, tablets and other commercially available telecommunications and computing devices, as well as in digital display devices and digital cameras. Those skilled in the art to which this invention pertains will understand the structure and operation of digital processors, GPGPUs and similar digital graphics processor units.

Those skilled in the art will appreciate that while the following detailed description provides sufficient detail to enable one skilled in the art to practice the present invention, the various examples, embodiments and practices of the present invention that are discussed and described below, in conjunction with the attached drawing figures, are provided by way of example, and not by way of limitation. Numerous variations, additions, and other modifications or different implementations of the present invention are possible, and are within the spirit and scope of the invention.

BRIEF DESCRIPTION OF THE DRAWINGS

FIGS. 8-14C are a series of flowcharts illustrating a number of methods and techniques according to various exemplary aspects and practices of the invention.

DETAILED DESCRIPTION OF THE INVENTION

Overview of the Invention

Figure 1:
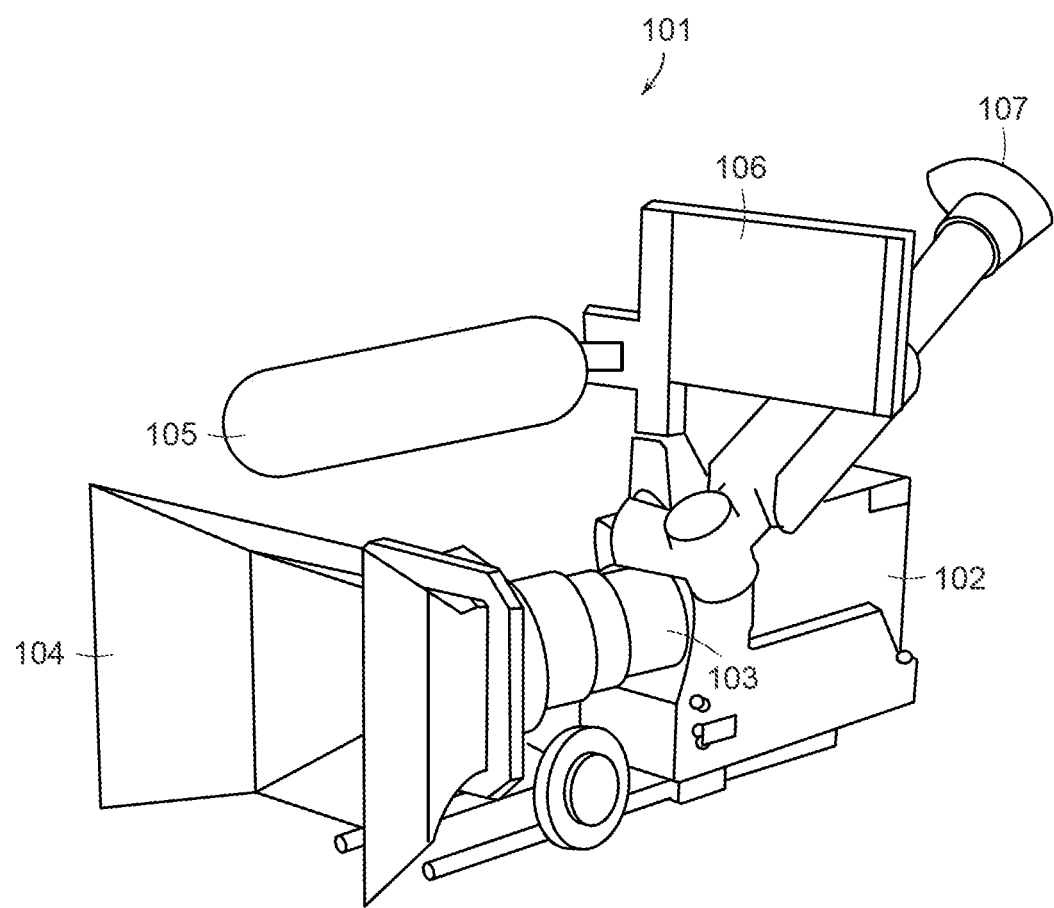
FIG. 1 is a perspective drawing of a motion picture camera system according to the prior art.

This document describes a camera system comprising at least one high quality "Main" camera, operating in conjunction with one or more additional "Buddy" cameras, and one or more processing modules. The main cameras and the buddy cameras are positioned such that they view substantially similar, but different, perspectives of a scene. The processing module is configured to calculate supplemental information for use in computational photography.

In some embodiments, multiple cameras may be calibrated as sets, and the processing module may perform stereo disparity searching operations to calculate disparity information for individual camera pixels. An exemplary embodiment may further perform a reconstruction process, in which rich pixel information is reconstructed from the images captured by two or more buddy cameras to create or augment a frame buffer aligned with the perspective of a main camera.

In some embodiments, the rich pixel information includes depth information.

By way of example, the Applicants have developed camera systems and configurations that incorporate one or more additional auxiliary image sensors, referred to herein as "Buddy Cameras", with one or more high quality traditional image sensors and associated optics, referred to herein as "Main Cameras". In an exemplary embodiment, the buddy camera devices may be fabricated using inexpensive components such as mobile phone cameras and fixed prime lenses, or utilize imaging sensors optimized for depth measurement. In an exemplary embodiment, the main camera devices are substantially similar to existing high-end camera systems comprising sophisticated and configurable optical lenses.

Creating Rich Pixel Information in a High-End Camera System

The rich pixel information produced by the multi-camera systems disclosed in the above-listed, commonly-owned patent applications incorporated herein by reference can be used as inputs to image manipulation operations such as compositing, image layer separation, computational focus change, perspective changes, and other post-capture or post-production image modification operations.

It will be understood, however, that many photographers and cinematographers may be reluctant to give up the control, performance, and familiarity of existing camera systems.

By leveraging the data from the buddy cameras, embodiments and practices of the invention can provide the best of both worlds: all of the information from a multi-camera system along with the optical control, fidelity, and user experience of a traditional camera system.

Throughout this document, the term "framebuffer" is utilized to refer generally to a two-dimensional buffer of information, or another data structure that can be transformed into such a two-dimensional buffer. Therefore, a buffer of depth values would still be referred to as a framebuffer. Similarly, a deep framebuffer may be a compound structure containing a number of disparate fields, potentially including depth, color, etc. In this document, we will often abbreviate "deep framebuffer" as simply "framebuffer." However, we explicitly disclaim the implication of a narrow interpretation limited to pixel color information.

Figure 2:
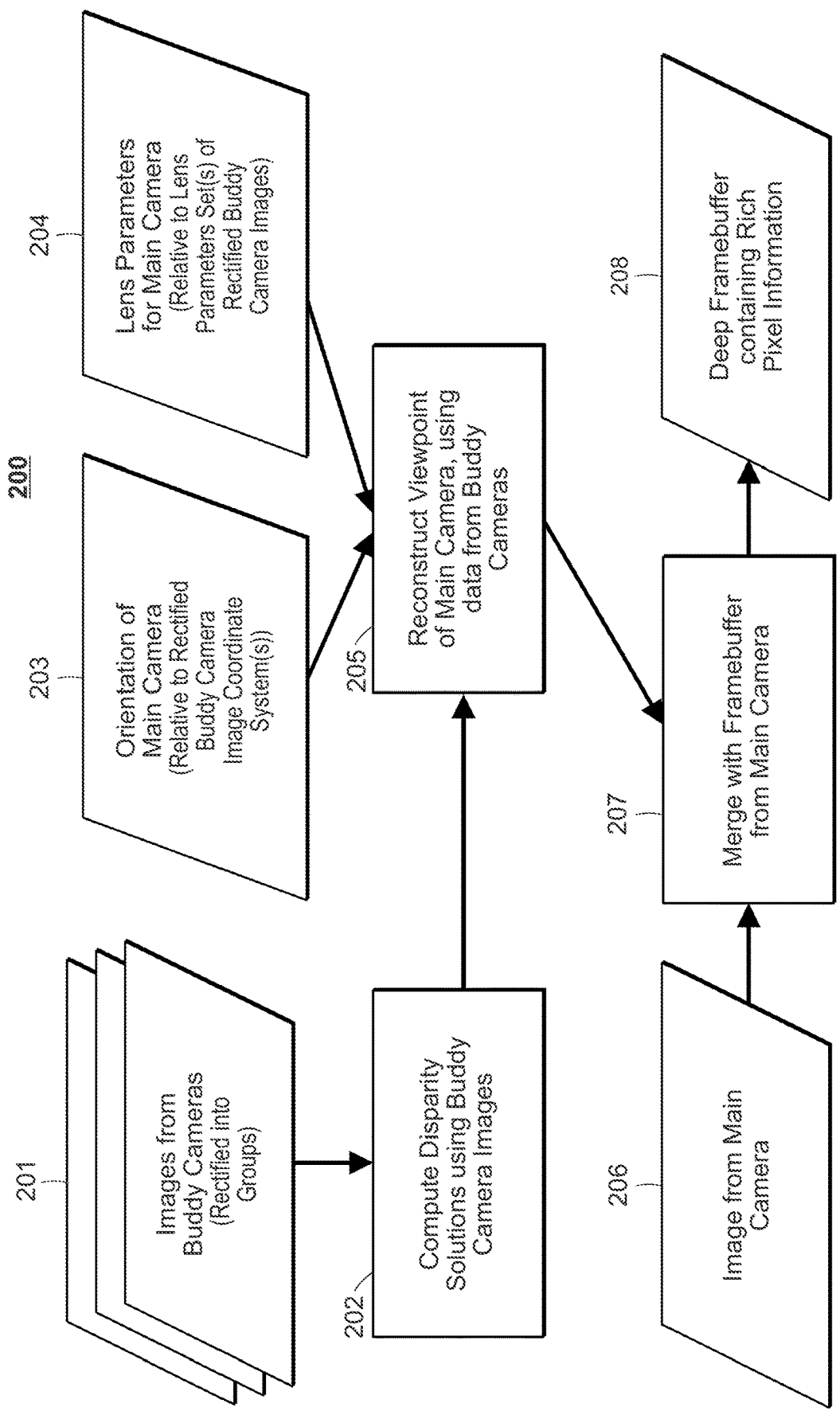
FIGS. 2 and 3 are flow diagrams of pipelines according to an exemplary aspect of the invention, in which image data from one or more "buddy cameras" are used to reconstruct pixel and depth information for pixels in a main camera perspective.
Figure 3:
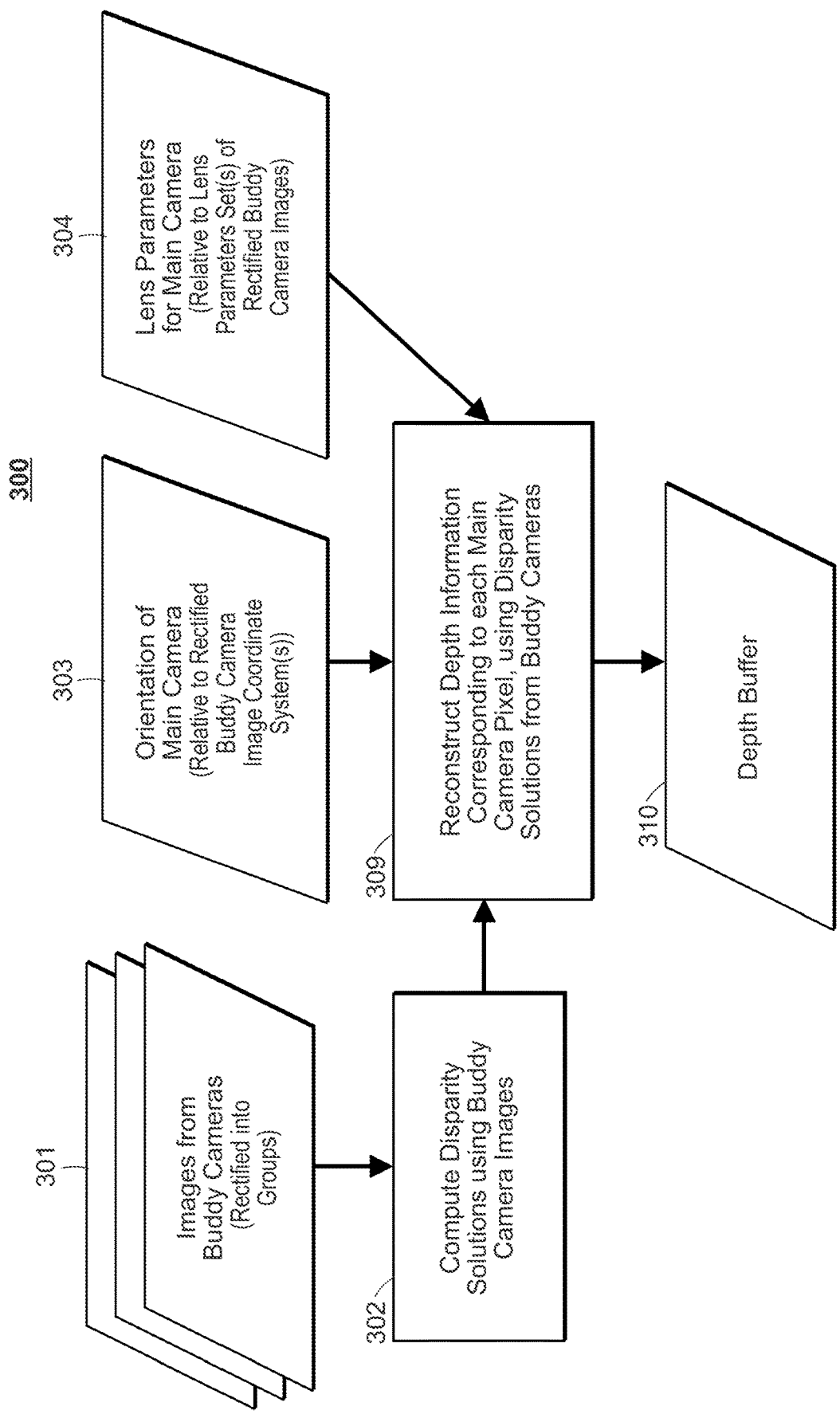
Figure 4:
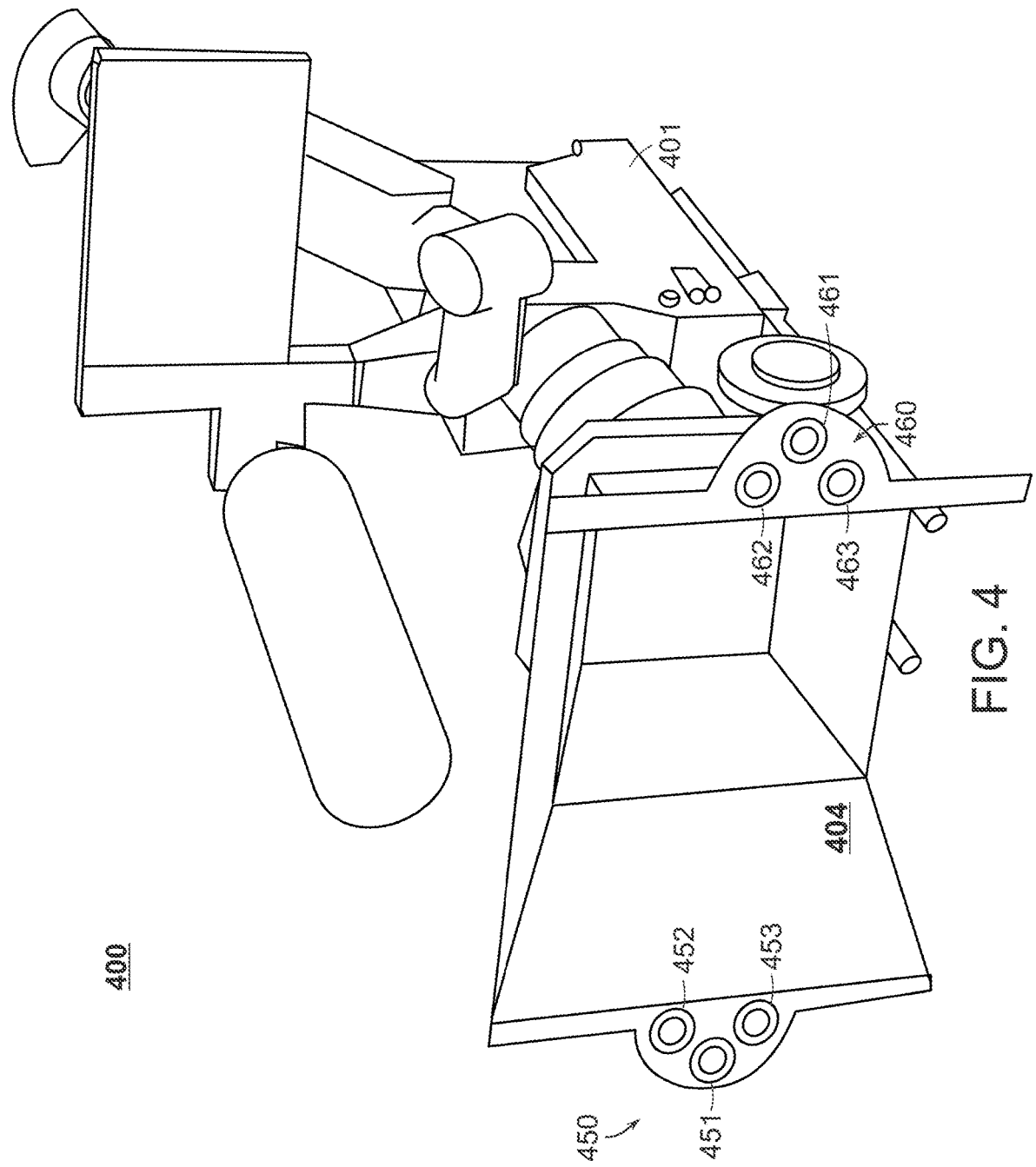
FIG. 4 is a perspective drawing of a camera system according to an exemplary aspect of the invention, in which a pair of buddy camera arrays are mounted onto the lens hood of a motion picture camera.
Figure 5:
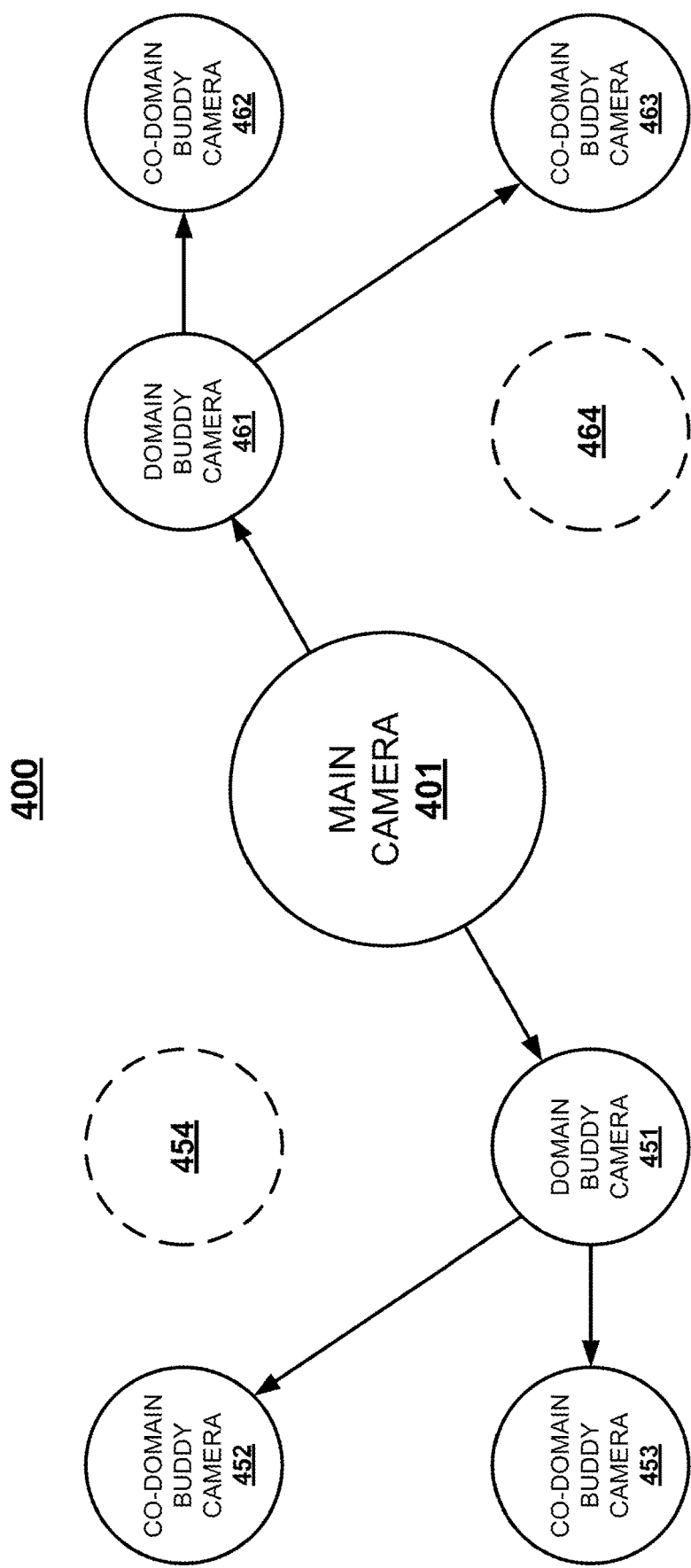
FIG. 5 is an abstract diagram of the system shown in FIG. 4.

FIGS. 2-5 depict aspects of exemplary embodiments or practices of the invention. In particular, FIG. 2 is a diagram of a pipeline 200 constructed in accordance with an aspect of the invention, to reconstruct rich pixel information for pixels in a main camera perspective using images captured by buddy cameras. FIG. 3 depicts a further exemplary embodiment of a pipeline 300 that includes the use of images from buddy cameras for reconstructing depth information for pixels in the main camera perspective. FIG. 4 depicts an exemplary embodiment of a camera system 400 according to the invention, comprising a main camera 401 with two buddy camera arrays 450, 460 mounted onto a lens hood on respective opposite sides of the main camera lens. FIG. 5 depicts an abstract representation of the FIG. 4 camera system 400.

The embodiment or practice of the invention shown in FIG. 2 comprises the following components:

Box 201: Capture buddy camera image data and store in framebuffer(s).

Box 202: Use buddy camera images to compute disparity solutions.

Box 203: Orient main camera relative to rectified buddy camera image coordinate system(s).

Box 204: Generate lens parameters for main camera relative to lens parameter set(s) of rectified buddy camera images.

Box 205: Use data from buddy cameras to reconstruct viewpoint of main camera.

Box 206: Capture main camera image data and store in framebuffer.

Box 207: Merge reconstructed viewpoint (Box 205) with framebuffer from main camera Box 208: Generate deep framebuffer containing rich pixel information.

Each of the above components is described in greater detail below, as follows:

Box 201: In the embodiment or practice shown in FIG. 2, two or more buddy cameras (such as the exemplary buddy cameras 451-453 and 461-463 depicted in FIG. 4) each capture substantially similar (but different) views of a scene, resulting in corresponding buddy camera framebuffers 201. One or more processing modules are then configured to transform the views from the buddy cameras into one or more rectified groups using calibration data associated with the buddy cameras. In some embodiments of the invention, all buddy camera frame buffers are transformed to the same common coordinate system, while in others embodiments, multiple coordinate systems may be used. The transformation process may involve compensating for lens distortion as well as an image rectification operation.

In addition, as shown in FIG. 2, an exemplary embodiment of the invention may execute stereo correspondence search operations 202 between the images from two or more buddy cameras, which are now rectified to one or more common coordinate system(s), potentially in a URUD space coordinate system, as disclosed in the commonly-owned patent applications listed above and incorporated herein by reference. This stereo correspondence search operation may incorporate data from additional buddy cameras in potentially different coordinate systems to resolve ambiguities and supplement missing data, as disclosed in the above-listed patent applications, including the Applicant's V3D and Reconstructor applications.

The result of the stereo correspondence search operations 202 is one or more buffers of disparity information, referred to as disparity solution(s). This disparity information may be represented as depth information, given that depth information can be calculated as a function of disparity information and camera system geometry.

This disparity information may be further processed. For example disparity buffers or depth buffers may be processed into hierarchical interval maps in order to enhance the efficiency of ray marching operations used in a reconstruction operation. Examples of techniques for such processing are set forth in the above-listed patent applications, including the Applicant's V3D and Reconstructor applications.

The system may also maintain relative perspective information 203 that relates the orientation of a main camera to the coordinate system(s) used to create the disparity solution(s) in 202. This relative perspective information may be referred to as a "Viewpoint Transform". It may contain terms relating a main camera to each buddy camera rectification group or coordinate system, such as position, translation, projection, scale, rotation, etc. A separate viewpoint transform may relate each main camera perspective to each coordinate system. For example, a system with one main camera and one common coordinate system common to all buddy cameras would have one single main camera viewpoint transform. Such a configuration may rectify all disparity solution(s) in 202 to a common rectified group with the main camera and thus only a single transformation would be required to re project each disparity solution onto the main camera's viewpoint.

The viewpoint transform(s) may be static or pre-calibrated, as may be the case for a system in which a main camera and buddy camera(s) are incorporated into the same device or are attached to a rigid mechanical unit. This information may also be generated by an additional sensor or set of sensors. Additionally, this information may be computed by correlating data captured by the main camera with data captured by the buddy camera(s).

As indicated in FIG. 2, a lens configuration 204 associated with a main camera may be provided to a processing module. This lens configuration may represent any aspect of the main camera lens, including the lens type, focal length, focal distance, principal point, projection, distortion, tangential distortion, chromatic aberration, or any additional information needed to characterize the lens. If a photographer or camera operator modifies any lens parameters, such as by adjusting a focus ring control element or adjust focal length in a varifocal lens, the updated parameters may be communicated to a processing module through an interface.

As indicated in FIG. 2, a processing module may perform a reconstruction operation 205 to reconstruct a framebuffer from the Disparity Solution(s) generated in 202, using the viewpoint transform 203, and the lens configuration, 204. This reconstruction may be performed using a rasterization method, a ray marching method, or another image processing method. Several reconstruction methods are disclosed in the Applicant's above-listed Reconstructor application, but exemplary embodiments of the invention may utilize an alternative method as well.

The data represented by each pixel within the reconstructed framebuffer may consist of any combination of: color information, intensity information, disparity information, depth information, and additional information.

Exemplary embodiments may configure the framebuffer resolution used for reconstruction based on the framebuffer resolution provided by the main camera. In some embodiments, the selected reconstruction resolution exactly matches the main camera resolution, and thus there is a 1:1 correspondence between pixels in the main camera framebuffer and pixels in the reconstructed framebuffer. Provided the viewpoint transform and the lens parameters used for reconstruction are a suitable match for the viewpoint and lens parameters of the main camera, each pixel should contain data pertaining to the same scene object or objects. For example, a pixel at a given offset in the main camera frame buffer may contain color data from an object in the scene, while the pixel at the same offset in the reconstructed framebuffer may contain depth information for the same object in the scene.

In other embodiments, the pixels in the reconstructed framebuffer may correspond to pixels in the main framebuffer with a ratio other than 1:1. For example, the reconstructed framebuffer may be twice the dimensions of the main framebuffer, such that each pixel in the main framebuffer corresponds to 4 pixels in the reconstructed framebuffer, arranged in a 2×2 block. Thus the reconstructed data is higher resolution, or oversampled. Similarly, some embodiments may perform an undersampled reconstruction, in order to conserve processing power, or because the buddy camera resolution is insufficient to capture images with enough fidelity.

Furthermore, a given practice of the invention may perform selective reconstruction operations. For example, one sample may be reconstructed for each 2×2 block of main framebuffer pixels, followed by additional samples being reconstructed for areas of the image where high frequency changes, or edges, are detected. This may be enabled through a pipeline employing a filter, such as a Sobel operator.

Some embodiments may perform a merge operation 207. This operation combines one or more reconstructed framebuffers generated in the reconstruction 205 with one or more main camera frame buffers 206 to produce one or more resultant "deep" framebuffers 208. These deep framebuffers may comprise layers for: color, intensity, depth, confidence information, infrared, etc.

In some exemplary embodiments, a primary purpose of the system is to provide pixel-precise depth information aligned with the color and intensity information from the main camera. In this regard, FIG. 3 depicts a pipeline 300 for reconstructing depth information for pixels in the main camera perspective using images from buddy cameras. In such an embodiment, depth information from the reconstruction operation (Box 309 in the FIG. 3 pipeline 300) can be used.

In the FIG. 3 pipeline 300, Boxes 301-308 correspond to Boxes 201-208 of the FIG. 2 pipeline 200. In Box 309, depth information corresponding to each main camera pixel is reconstructed using the disparity solutions computed in Box 302, the main camera orientation information from Box 303, and the main camera lens parameters from Box 304. In Box 310, the depth information is stored in a depth buffer. (For the purposes of the present discussion, it is assumed that the corresponding elements of the FIG. 2 pipeline 200 and the FIG. 3 pipeline 300 are freely interchangeable, and that any elements that are unique to one of the pipelines may be freely incorporated into the other pipeline.)

In some exemplary embodiments of the invention, a depth buffer 210 (as shown in FIG. 3) is produced by itself, while in other embodiments the depth information is merged with color information that was sourced from the main camera frame buffer 206. For example this embodiment may generate output RGBD frame buffers 208.

In some embodiments, a reconstructed framebuffer, created by a reconstruction operation 205, may align with a main camera frame buffer such that the merging operation 207 may source some information from the reconstructed framebuffer created by reconstruction 205 and other information from the main camera framebuffer 206 when creating the resultant deep framebuffer, 208.

Some embodiments may store the information for later processing. An exemplary implementation may store the images captured by the buddy cameras 201, the viewpoint transform 203, the lens parameters 204, and the main camera framebuffer 206, and perform the remaining operations at a later time.

Another implementation may store the disparity solutions generated in the stereo correspondence search operations 202, along with the viewpoint transform 203, the lens parameters 204, and the main camera frame buffer 206, and defer further processing to a later time.

Yet another implementation may store the reconstructed framebuffer generated by reconstruction 205, and the main camera framebuffer 206.

An application requiring immediate user feedback may execute the entire pipeline in real time. Such an embodiment may be preferred for pre-visualizing computer generated (CG) effects for cinematic production, or for showing a real-time pixel precise depth information for assisting in accurate focusing of the main camera lens.

Embodiments of this invention may perform different aspects of the pipelines of FIG. 2 or 3 at different times or in different devices. For example, an exemplary implementation may store Buddy Camera Images 201, for later processing.

Another alternative embodiment may Compute Disparity Solutions 202 in real time during the capture of scene images, but then transfer the data elsewhere to perform the Reconstruction of a Main Camera Viewpoint 205, or Reconstruction of Depth Information 209. Those skilled in the art will understand that such choices, or changes to the locality of pipeline stages or buffering of data for later processing, including saving and loading, do not fundamentally affect the practice of the invention and are within the spirit and scope of the invention.

Device Embodiments

In some embodiments, individual buddy cameras, pairs of buddy cameras, or sets of multiple buddy cameras, may be mounted together in a rigid mechanical frame. These devices, referred to as "Buddy Camera Units", may be incorporated into one or more components of an existing camera system, such as a camera body, lens enclosure, or lens hood. Alternatively, they may be attached to such components in a temporary, semi-permanent, or bolt-on manner.

In other embodiments, buddy camera units may be completely detached devices. As detached devices, one or more buddy camera units may be arranged in a temporary installation, such as on a filming location, or in a permanent installation such as installation in a studio.

The following discussion sets forth a number of embodiments and discloses aspects of the invention that are useful in certain modes to implement such embodiments. However, this should not be construed to limit which aspects may be incorporated into which embodiments. In other words, an aspect disclosed as being relevant to one embodiment may be equally relevant to another embodiment of the present invention, even if the description of such embodiment does not make specific mention of the aspect.

Incorporation into a Camera Device

FIGS. 4 and 5, noted above, are next described in greater detail.

FIG. 4 depicts an exemplary embodiment of a system 400 according to an exemplary aspect of the invention, featuring a first set of buddy cameras 450 mounted on a first side of the lens hood 404 of a main camera 401, and a second set of buddy cameras 460 mounted on a second side of the lens hood 404. Each set of buddy cameras 450, 460 comprises a respective array of three individual buddy cameras 451/452/453 and 461/462/463. (Thus, in the exemplary embodiment depicted in FIG. 4, the buddy cameras are organized into two sets of three buddy cameras each.)

In the FIG. 4 system 400, the arrays of buddy cameras 450, 460 are mounted directly to the main camera device 401. In such a combined device, the viewpoint transform between the main camera and the buddy camera domain(s) will be fixed. Such a device may be calibrated in a controlled environment, potentially with the aid of a calibration pattern.

In this configuration, two sets of disparity maps are calculated. One set of disparity maps is created from the left set of buddy cameras 450 and the other is created from the right set of buddy cameras 460. The disparity maps may be created using methods disclosed in, e.g., the V3D and Reconstructor applications listed above and incorporated herein by reference. The disparity maps may also contain an associated disparity confidence value indicating how likely the measurement is to be accurate.

Then, each set of disparity maps is used to reconstruct rich pixel information, potentially comprising depth information, for pixels that align with the frame buffer of the main camera. In such an embodiment, the disparity maps from the left set of buddy cameras will be provided as input to a reconstruction operation, and a framebuffer will be reconstructed with a perspective shifted to the right of the perspective of the buddy cameras.

Conversely, the disparity maps from the right set of buddy cameras will be provided as input to a reconstruction process resulting in a framebuffer with a perspective shifted to the left of the perspective of those buddy cameras.

The resultant re-projected disparity buffers represent the same overlapping virtual camera perspective, but each will contain accurate data that the other does not contain. During the reconstruction operation, both re-projected framebuffers are considered, in order to reduce the amount of error in the resultant reconstructed framebuffer. The reconstructed buffers may contain confidence values associated with each pixel or group of pixels. Some embodiments may reconstruct multiple independent frame buffers, which may then be merged into a final frame buffer. This merging may utilize confidence values to determine which buffer to prefer as the source for each pixel or group of pixels. Alternatively, the confidence values may be used to calculate weights with which to blend data from the source buffers.

FIG. 5 depicts an abstract representation of the camera system 400 of FIG. 4. In the diagrams of FIGS. 4 and 5, there is depicted an example of a system containing six buddy cameras 451/452/453 and 461/462/463, of which a disparity map is generated for only two buddy cameras 451, 461 (denoted herein as "domain" cameras) and the remaining buddy cameras 452/453, 462/463 are used as the co-domain for the stereo searches from the perspective of the domain buddy cameras 451, 461. However, a similar embodiment may include more or fewer buddy cameras. For example, as indicated by dashed circles 454 and 464 in FIG. 5, an embodiment may include, for example, eight buddy cameras arranged into two groups of four, positioned to the side of a main camera lens.

Another exemplary embodiment may include one group of three buddy cameras, and it may be positioned above the main camera.

Yet another embodiment may include only two buddy cameras, each mounted on an opposing side of the main camera lens.

The stereo disparity searching methods disclosed in the above-listed, commonly owned V3D patent applications provide excellent performance when cameras are arranged in a substantially perpendicular or "L-shaped" arrangement, but other configurations could also be used, and other considerations, such as industrial design or product design, may mean that another configuration is preferable for a given application.

Performing Stereo Correspondence Using a Main Camera

In another embodiment of the invention, stereo disparity searching may be performed using data from the main camera frame buffer. This embodiment may be particularly useful where a product design does not permit a large number of buddy cameras, potentially for a combination of cost and form-factor reasons.

Embodiments that use the main camera framebuffer(s) as a source for some of the input data to the stereo correspondence search typically will first un-distort and rectify the framebuffer to a domain that is common with the buddy camera(s).

Figure 6A:
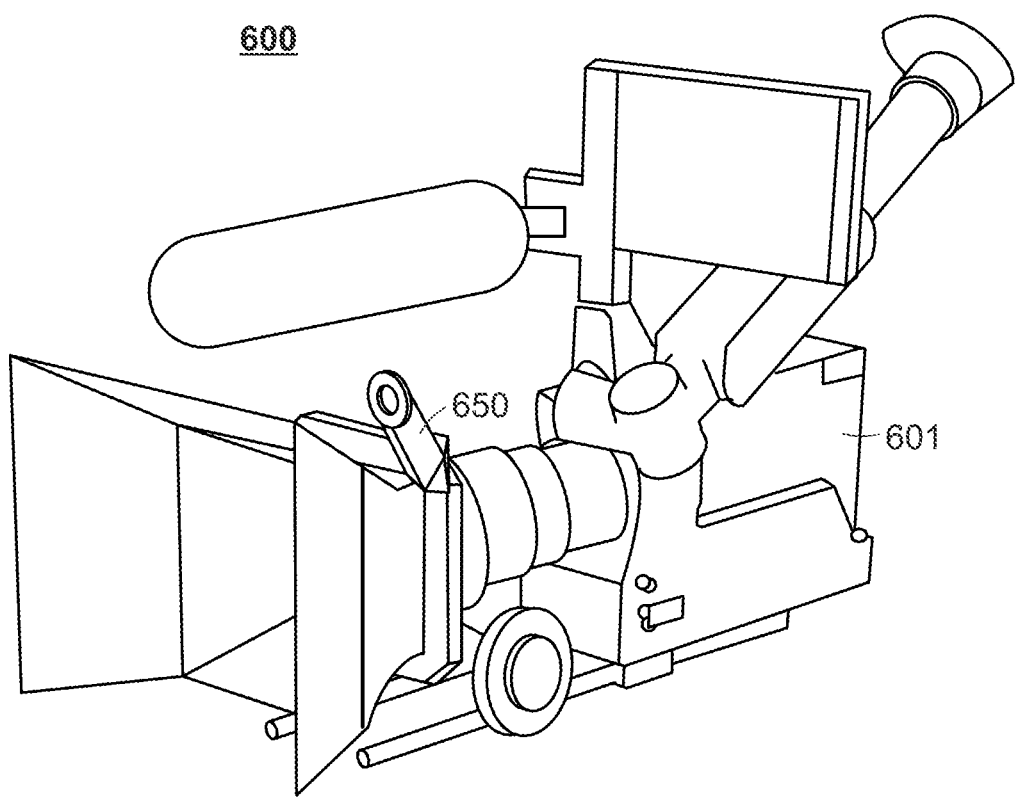
FIGS. 6A and 6B are a pair of perspective drawings illustrating a singleton buddy camera supplementing data captured by a main camera.
Figure 6B:
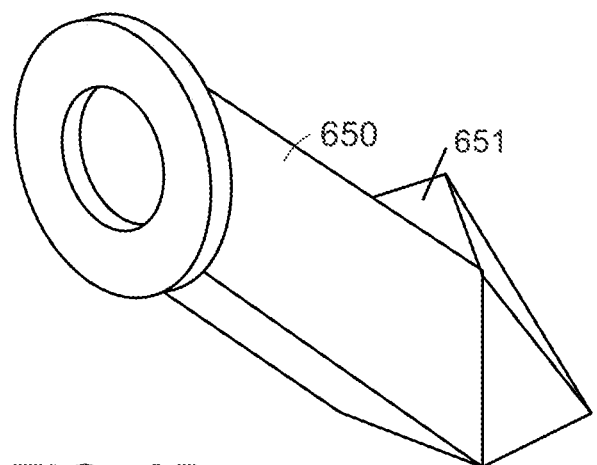

By way of example, FIGS. 6A and 6B depict an embodiment of a system 600 illustrating a singleton buddy camera 650 supplementing the data captured by a main camera 601. FIG. 6A illustrates the buddy camera 650 mounted in-situ, while FIG. 6B illustrates the buddy camera and its mounting bracket 651 shown without the main camera.

In particular, the embodiment illustrated in FIG. 6A shows a single buddy camera mounted to a camera system comprising a main camera. In this example, the mounting position of the buddy camera is chosen such that the focal point of the buddy camera is close to the focal point of the main camera, but also such that the main camera's lens hood does not obscure the view from the buddy camera.

Figure 7:
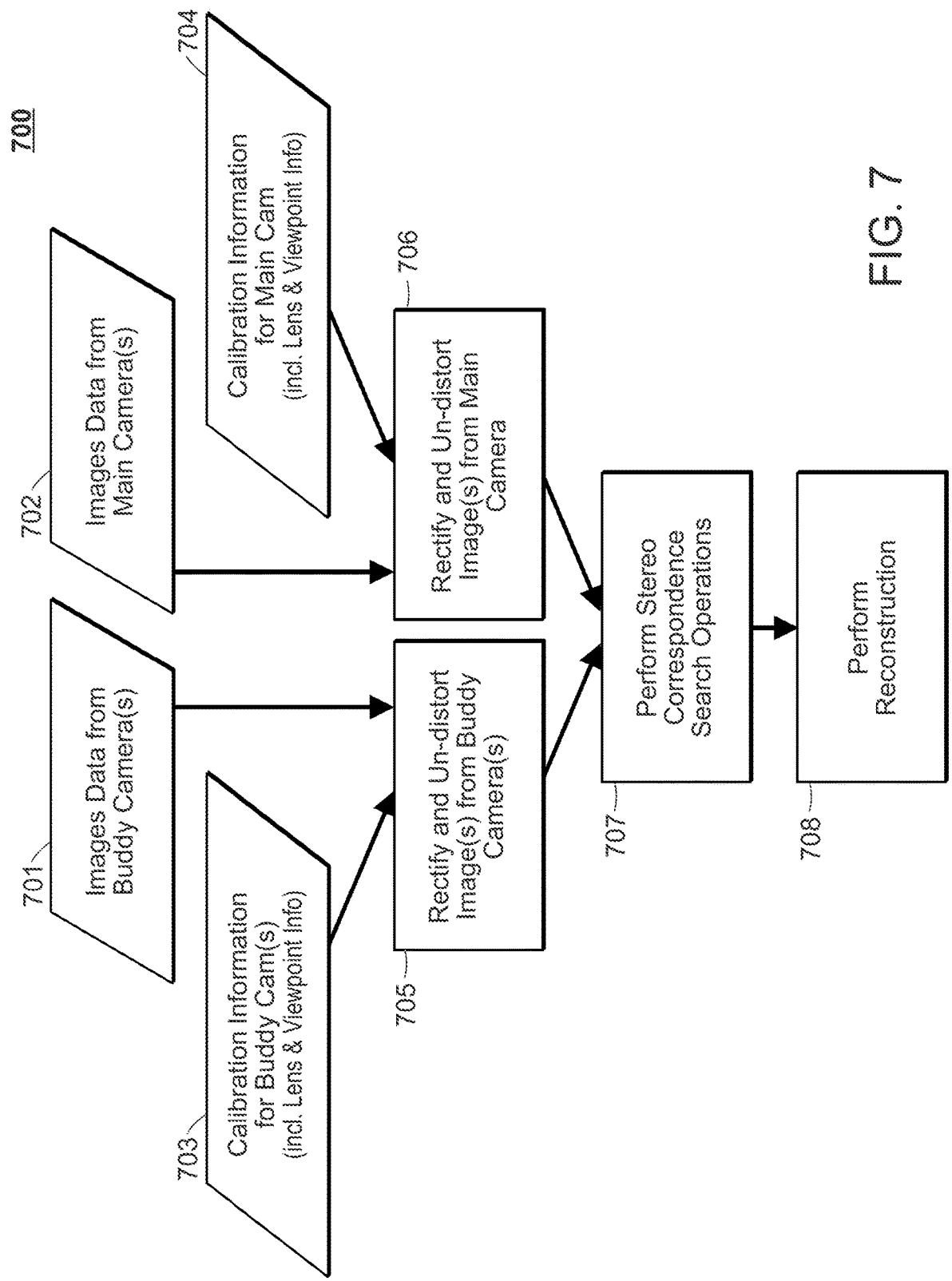
FIG. 7 is a flowchart depicting a set of operations performed by an exemplary embodiment of a camera system according to the invention, which performs stereo disparity correspondence search between image data from a main camera and image data from one or more buddy cameras.

FIG. 7 is a flowchart depicting a set of operations 700 performed by an embodiment that performs stereo disparity correspondence search between the image data from a main camera and image data from one or more buddy cameras. An exemplary embodiment implementing the method disclosed in FIG. 7 contains one main camera producing images 702 and one buddy camera producing images 701.

Calibration information 703 can be used in an image processing operation 705 to rectify and un-distort images) 701 to a common domain. Similarly, calibration information 704 can be used by image processing operation 706 to rectify and un-distort image(s) 702 to the same common domain as image processing operation 705.

Stereo correspondence search operation 707 may then locate common features between corresponding images, and may further save the correspondence information to a buffer.

Furthermore, this buffer may be processed to derive depth information as disclosed earlier, or it may be used as an input to a reconstruction operation 708 to reconstruct a framebuffer from a virtual viewpoint.

If the lenses of the main camera are fixed and the buddy camera(s) are rigidly mounted with respect to the main camera, then calibration information 703 and 704 may be static. Such calibration information may be measured in a factory setting.

However, if the buddy camera(s) are provided as removable accessories, then additional calibration may be needed. Regardless of the reason for loss of calibration accuracy, a system embodying the invention may benefit from the ability to reset its calibration or measure calibration information in the field.

In one embodiment of the invention, a test pattern containing shapes of known dimensions or proportions is placed within the view of two or more cameras simultaneously. Then, software executed by a processing unit may infer the necessary calibration information and store it for later use. A checkerboard pattern is well suited as a test pattern.

In another embodiment, field calibration is achieved by positioning the rigid camera system such that a set of objects in a scene are visible, then moving the rigid camera system closer towards or further from the same objects in the scene. It may be necessary to perform this operation repeatedly. From these data points, the calibration information may eventually be calculated with a suitable precision.

Systems performing stereo correspondence search operations on main camera framebuffer data will perform better when the main camera lenses are more similar to the lenses on the buddy camera(s). For example, lenses with a similar depth of field and focal length will perform better than lenses with vastly different parameters. Similarly, lens configurations with a deeper depth of field will perform better than lenses with a shallower depth of field due to the comparative difficulty of finding stereo correspondence in image data containing substantial bokeh (selective foreground/background blurring) effects.

If a main camera includes adjustable or replaceable optical lenses, the calibration information must account for this. The calibration information, therefore, should be a function of all of the user-modifiable parameters, as disclosed elsewhere herein.

Lens Calibration as a Function of Operator-Modifiable Parameters

Adjustable optical lenses, such as a lens with manual or automatic focus capability or a telephoto lens with adjustable zoom, are mechanical systems. Often the available adjustment parameters are implemented using mechanical components that physically move or change position to implement the adjustment. Therefore, an operator modifying or adjusting one lens parameter may, in effect, be modifying other parameters as well. When this phenomenon concerns a change of focus in response to a change in zoom or focal length, it is known as "lens breathing" or "focus breathing."

In some lens systems these concomitant parameter changes are an unwanted side effect, while in other lens systems they are part of the design specification. Zoom lenses that are designed to minimize the focus change related to zoom change are often described as parfocal lenses, although some do not contain the traditional parfocal mechanism and instead compensate for zoom change using electronically controlled focus changing.

Regardless of the cause of, and the degree to which, the phenomenon affects the image seen by the camera, some of the methods of the invention may best be practiced using extremely precise characterization of the optics of the lens.

Therefore, an embodiment of the invention may comprise a computational model to calculate or determine the physical properties of an optical lens system with a high degree of precision. One way to conceptualize the computational model is as a multi-dimensional function. For a given set of input values, another set of output values are provided, mathematically characterizing the physical optics of the lens system.

This model may be implemented with any combination of: mathematical functions, computer-executable functions, look-up tables, etc. Inputs to this model may include one or more of the following: focal length, zoom, focal distance, the focus ring, or any settings or adjustments for the various operator-controllable parameters of the lens. Outputs to the model may include any parameters that affect lens optics. These parameters may include: focal length, zoom, focal distance, the principal point, distortion, polynomial distortion, tangential distortion, chromatic aberration, etc. This computational model may also retain state over time.

In some embodiments, a lens manufacturer may supply a computational model. In other embodiments, a computational model may be developed by characterizing the physical lens. For lenses with electronically controllable parameters, such as a lens system with auto-focus capabilities, a software-controlled process may be used to develop the model. In an example embodiment, software could "sweep" each parameter across its range while observing the effects on the camera's output image. This process may involve utilizing a reference object or a test pattern. In the case of a multi-dimensional parameter space, the sweep may exhaustively cover the parameter space, or employ a sampling technique to characterize the most important regions of the parameter space.

Developing a computational model empirically by measuring a specific lens may provide a more accurate model because manufacturing variances in the lens, as well as changes that have affected the lens properties over time, will be accounted for in the computational model. In situations where extreme precision is required, some embodiments may re-develop the computational model frequently in order to account for subtle changes to the optics from mechanical shocks, as well as changing environmental conditions such as ambient temperature and humidity.

A computational model may retain state about previous settings, and use this state to improve accuracy of the output. For example, mechanical slop may exist in the mechanical lens system caused by the flexibility of components within the system as well as imperfect precision in mechanical joints. For example, the precise optical configuration may be slightly different when a focal control has come to rest at a certain setting after a decreasing action, from the precise optical configuration achieved when that same control comes to rest at the identical setting from an increasing action. This imprecision or mechanical slop may be accounted for in the computational model in order to represent the optical configuration with more fidelity.

In other embodiments, if multiple optical lens systems are used in series, such as where the light passing through one lens is then passed through another, then computational models representing the individual lens systems may be mathematically combined to accurately represent the combined optical light path.

Additional Implementation Options

Dynamic Viewfinder

In some embodiments of the invention, a resulting frame buffer, containing information reconstructed from the buddy camera(s), may be shown to a director or cinematographer in an electronic viewfinder.

This viewfinder may be part of a main camera assembly, or it may be an additional device located elsewhere. In another embodiment, the camera system may stream frame buffer data through any transmission or streaming protocol known to those skilled in the art, such that the stream may be viewed on a device such as a laptop, tablet, or external monitor. This streaming may take place via an analog medium including radio transmission, or may utilize a digital network including wired and wireless variants.

This viewfinder may present information beyond what the main camera viewfinder can typically present in traditional systems. For example, the viewfinder may present the director or cinematographer with a depth-map or an infrared view of the scene.

In another embodiment, the viewfinder can be configured to display real-time renderings for scenes that blend live action with computer generated effects. For example, the viewfinder or display may present a pre-visualization of the scene as it may look after post-production effects have been applied. These rendering may serve as guides for the director, cinematographer, and actors, or may actually be high enough quality for the ultimate viewers to watch.

For example, a computer-generated character, or a placeholder/stand-in for a CG character, may be composited, in real time, into the image in the viewfinder. This may help the director or cinematographer with scene composition, or a monitor may display a view that actors can use to refine their performance.

In some further embodiments, a CG character or effect may respond to spatial information captured from live actors. For example, a CG character may be scripted to shake hands with the live actor. The CG effects system may adapt to the precise spatial positioning of the actor's hand, and alter the pose of the CG character in response.

Improved Auto-Focus

Professional camera systems often comprise an automatic focus feature. The auto-focus feature usually involves one or more motors moving mechanical components of a lens assembly, and is often controlled by a controller module. In traditional camera systems, the controller module adjusts the focus such that a region of the resultant main camera image is maximally sharp; in other words, to maximize the frequency, and therefore sharpness of a specific region of the image.

In camera system embodiments of the invention, an accurate estimate of the depth for every point that is visible to the main camera can be computed, using information from the buddy cameras. Using this depth information, a controller can adjust a main camera lens to achieve superior focus, as the desired focal depth can be known up front. This is an improvement over the state of the art in two ways, as follows:

1) Focal accuracy can be improved because the precise depth of a single pixel can be known, and it is not necessary to consider other features within the region of the main camera image. This means a low contrast scene feature can automatically be brought into perfect focus, if desired by the cinematographer, even if a higher contrast scene feature exists within the image region.

2) Focusing speed can be improved because there is less risk of "overshooting" the desired focal distance. Because the final target focal distance is known up front, the controller unit is free to move the focus more rapidly, and begin decelerating motors and the components in the lens assembly, as the target focal distance draws near. The controller module can anticipate the internal inertia of the motor and lens components, and control the focus motors appropriately. This is in contrast with a system that must react to the image as seen through the lens components in their present configuration, meaning it must react quickly, and the inertia may cause the system to overshoot the desired lens configuration.

This aspect of the invention may be further utilized in conjunction with an image-processing module to enable automatic focus to dynamically track a moving target. For example, the image-processing module may perform facial recognition in order to identify an actor within a scene. (Facial recognition techniques are described in the Applicant's above-listed application PCT/US16/32213.) Then, the image-processing module may select an appropriate depth value for the actor, in real-time, and the automatic-focus controller could adjust the main camera lens to keep that actor in focus. The system could be configured to keep the actor in focus as he or she moved closer to or further from the camera.

Monochrome Buddy Cameras

Some camera image sensors include a Bayer filter, in front of the image sensor in the light path. Some sensors manufacturing processes physically bond the Bayer filter to the sensor such that it is impossible to remove. While the filter allows the sensor to capture color information it effectively decreases the resolution of the sensor. A 2×2 Bayer pattern effectively reduces the sensor's pixel count by four.

In some embodiments, buddy cameras can operate with monochrome data and thus do not require the color information from a sensor incorporating a Bayer filter.

In many embodiments, increased camera sensor resolution provides a more meaningful increase in signal fidelity for stereo correspondence matching than the pixel chrominance data.

For embodiments in which the primary additional value is the capture of depth or disparity data, color data from buddy cameras may not be required and the omission of a Bayer filter will result in an improvement in buddy camera resolution, and thus accuracy, or an improvement in the cost of components for the system.

Infrared-Sensitive Buddy Cameras

Many image sensors and image sensing components include filters that are opaque to infrared or near-infrared wavelengths of light. These filters are often known as Infrared Cut-off Filters, IR cut filters, or NIR (near-IR) filters. This is a valuable feature of camera systems designed for visible light photography to avoid the unnatural appearance of images caused by including data from light that is invisible to human eyes.

The information contained in the IR and NIR spectrum may be useful to buddy cameras, which seek to capture high fidelity information about the objects in the scene. This is especially true in low-light conditions when there is less visible light for the buddy cameras to capture.

In some embodiments, one or more buddy cameras will not incorporate an IR cut filter.

In addition, some embodiments may additionally include auxiliary infrared lighting, potentially in the form of IR emitter(s) such as an IR floodlight, to increase the amount of information available to the buddy cameras while not affecting the view of the scene as observed by the main camera(s). In some embodiments, one or more IR emitters may be incorporated into a camera device within the camera system. In some embodiments, one or more IR emitters may be positioned such that the scene is illuminated with infrared light.

In some embodiments of the invention, the infrared images captured from the buddy cameras may provide useful scene information. In such implementations, an IR channel can be made available as a component of a deep frame buffer.

Shutter Synchronization Across Cameras

In some embodiments of the invention, shutters or virtual shutters may be synchronized between multiple cameras. The Applicant's above-listed V3D and Reconstructor applications disclose synchronization between cameras used for stereo disparity analysis. Synchronization between cameras that contribute frame buffers toward a stereo disparity analysis operation is important, as a lack of synchronization can drastically affect the accuracy of results.

Although not as critical, shutter synchronization between a buddy camera array and a main camera is desirable, even for embodiments in which the main camera frame buffer is not used as an input to a stereo disparity analysis operation. Such synchronization will improve correspondence between reconstructed pixels and main camera pixels.

Accordingly, in one embodiment of the invention, each group of buddy cameras has one camera or module designated as a shutter master, responsible for signaling the shutter operations of all buddy cameras within the group.

In another embodiment, the main camera may rely on the same synchronization signal as a group of buddy cameras to control its shutter. In a different embodiment, a main camera may produce a synchronization signal to control the shutters of buddy cameras.

In yet another embodiment, camera shutters may be controlled through a highly accurate synchronized clock. Each camera device may operate its shutter or shutters at pre-agreed times or at a pre-defined cadence. Information about when the shutter should operate may be transmitted via a network, including a wireless network.

The clocks on each device participating in the camera system may be synchronized through an external timing source, such as by using the Network Time Protocol (NTP), or by using the Global Positioning System (GPS) as a source for accurate time information.

In addition, frames captured by buddy cameras or main cameras may be time-stamped, so that disparity analysis operations can be executed at a later time. Such an embodiment may transmit the frames from one or more camera devices to a central processing device where disparity analysis may be performed on frames with the same or similar time stamps. Disparity analysis may be performed in real-time, or the time-stamped frames may be saved, for the purpose of performing disparity analysis later, in an "offline" manner.

Digital Processing Environment in which the Invention can be Implemented

Those skilled in the art will understand that the above described embodiments, practices and examples of the invention can be implemented using known computer processor, network and telecommunications devices as appropriate, in which the processors, network and telecommunications devices can include known forms of cellphones, smartphones, and other known forms of mobile devices, tablet computers, desktop and laptop computers, and known forms of digital network components and server/cloud/network/client architectures that enable communications between such devices.

Those skilled in the art will also understand that method aspects of the present invention can be executed in commercially available digital processing systems, such as servers, PCs, laptop computers, tablet computers, cellphones, smartphones and other forms of mobile devices, as well as known forms of digital networks, including architectures comprising server, cloud, network, and client aspects, for communications between such devices.

The teens "computer software," "computer code product," and "computer program product" as used herein can encompass any set of computer-readable programs instructions encoded on a non-transitory computer readable medium. A computer readable medium can encompass any form of computer readable element, including, but not limited to, a computer hard disk, computer floppy disk, computer-readable flash drive, computer-readable RAM or ROM element or any other known means of encoding, storing or providing digital information, whether local to or remote from the cellphone, smartphone, tablet computer, PC, laptop, computer-driven television, or other digital processing device or system. Various forms of computer readable elements and media are well known in the computing arts, and their selection is left to the implementer.

In addition, those skilled in the art will understand that the invention can be implemented using computer program modules and digital processing hardware elements, including memory units and other data storage units, and including commercially available processing units, memory units, computers, servers, smartphones and other computing and telecommunications devices. The term "modules", "program modules", "components", and the like include computer program instructions, objects, components, data structures, and the like that can be executed to perform selected tasks or achieve selected outcomes. The various modules shown in the drawings and discussed in the description herein refer to computer-based or digital processor-based elements that can be implemented as software, hardware, firmware and/or other suitable components, taken separately or in combination, that provide the functions described herein, and which may be read from computer storage or memory, loaded into the memory of a digital processor or set of digital processors, connected via a bus, a communications network, or other communications pathways, which, taken together, constitute an embodiment of the present invention.

The terms "data storage module", "data storage element", "memory element" and the like, as used herein, can refer to any appropriate memory element usable for storing program instructions, machine readable files, databases, and other data structures. The various digital processing, memory and storage elements described herein can be implemented to operate on a single computing device or system, such as a server or collection of servers, or they can be implemented and inter-operated on various devices across a network, whether in a server-client arrangement, server-cloud-client arrangement, or other configuration in which client devices can communicate with allocated resources, functions or applications programs, or with a server, via a communications network.

It will also be understood that computer program instructions suitable for a practice of the present invention can be written in any of a wide range of computer programming languages, including Java, C++, and the like. It will also be understood that method operations shown in the flowcharts can be executed in different orders, and that not all operations shown need be executed, and that many other combinations of method operations are within the scope of the invention as defined by the attached claims. Moreover, the functions provided by the modules and elements shown in the drawings and described in the foregoing description can be combined or sub-divided in various ways, and still be within the scope of the invention as defined by the attached claims.

The Applicants have implemented aspects of the present invention in prototype form. One implementation comprises a complete device, including multiple cameras/image sensors, thereby including an array of "buddy cameras"; and in an exemplary practice of the invention, the viewpoint was translated to a position corresponding to a camera in the center of the apparatus (representative of an example of a "main camera"). In addition, the computer-executed reconstruction methods of the invention were configured to apply various lens effects corresponding to real-world lenses.

In an exemplary implementation of the present invention, the Applicants used the following hardware and software structures and tools, among others, to create the noted implementations:
1. A seven inch 1280×800 IPS LCD display.
2. Four PointGrey Chameleon3 (CM3-U3-13S2C-CS) 1.3 Megapixel camera modules with ⅓" sensor size assembled on an aluminum plate with shutter synchronization circuit.
3. Sunex DSL377A-650-F/2.8 M12 wide-angle lenses.
4. An Intel Core i7-6770HQ processor which includes on-chip the following:
   a. An Intel HD Graphics 580 Integrated Graphics Processing Unit; and
   b. An Intel QuickSync video encode and decode hardware pipeline.
5. OpenCL API using Intel Media SDK running on Linux operating system to implement, among other aspects: Image Rectification, Fast Dense Disparity Estimate(s) (FDDE) and Multi-level Disparity Histogram aspects.
6. OpenGL API running on Linux operating system to implement Multiple Native Disparity Map Voting and image reconstruction.
7. Intel Media SDK to access Intel QuickSync video compression hardware.
8. PhidgetSpatial 0/0/3 Basic accelerometer module and Linux API to determine device orientation.
9. DUB Face Detection library to locate presence of viewer's face.
10. In addition, the Apple iOS SDK was used to access accelerometer, gyroscope and compass for device orientation and to access video decode hardware; and the OpenGL ES API to implement multiple native disparity map voting and image reconstruction to enable an iPhone-based prototype of a receiving device.

Flowcharts of Exemplary Practices of the Invention

FIGS. 8-13 are flowcharts illustrating method aspects and exemplary practices of the invention. The methods depicted in these flowcharts are examples only; the organization, groupings, order and number of operations in the exemplary practices can be varied; and the exemplary practices and methods can be grouped, arranged or ordered differently, and include different or additional functions, whether singly or in combination, while still being within the spirit and scope of the present invention.

Elements shown in the flowcharts in parentheses are, among other aspects, optional in a given practice of the invention.

All the text and respective textual elements of the accompanying flowcharts are incorporated by reference into this Detailed Description of the Invention as if set forth in their entireties in this Detailed Description of the Invention, in the respective order in which they appear in the flowcharts, while noting that the grouping, organization, order and number of operations in the exemplary practices can be varied; and the exemplary practices and methods can be arranged or ordered differently, and include different or additional functions.

It should be noted that the method aspects described herein and depicted in the accompanying drawing figures can be embodied in devices, systems or computer software/program code operable in accordance with such method aspects of the invention; and that to one skilled in the technology of digital processors and computer software/program code for digital image or signal processing, the teachings of the method aspects described herein are also teachings of the configuring of devices, systems or computer software/program code operable in accordance with such method aspects of the invention.

In particular, FIG. 8 depicts aspects of a method for creating a deep frame buffer, in conjunction with an apparatus comprising a main camera and an array of buddy cameras operable to capture images, in accordance with an exemplary practice of the invention, as follows:

800. Method For Creating Deep Frame Buffer (Using Main Camera and Array Of Buddy Cameras Operable To Capture Images):
801. Receive at least two images from the array of buddy cameras;
802. Rectify and un-distort buddy camera images into at least one common coordinate system;
803. Compute at least one disparity solution based on the rectified and undistorted images;
804. Reconstruct a frame buffer utilizing parameter information, the parameter information comprising: (i) relative orientation information relating the main camera to the buddy camera array, and (ii) relative lens information relating the main camera lens configuration to the undistorted buddy camera images; and 805. Merge at least one reconstructed frame buffer with at least one frame buffer captured from a main camera.

FIG. 9 depicts optional/additional elements relating to creating a deep frame buffer, in accordance with exemplary practices of the invention, as follows:

900. Optional Aspects of Creating Deep Frame Buffer:
(901. Pixels in a reconstructed frame buffer have a correspondence with pixels in a main camera frame buffer.)
(902. The correspondence can be 1 to 1.)
(903. Reconstructed frame buffer comprises depth information.)
(904. Execute additional image effects, comprising any of: compositing, layer separation, computational focus change, perspective change, image filtering, post production effects, or a combination of effects.)
(905. The relative orientation information comprises any of: spatial position, rotation, coordinate scale, spatial translation, projection information, additional transformation information.)
(906. The relative orientation information can be calibrated in advance of system operation.)
(907. The relative lens information comprises a selected combination of lens type, focal length, focal distance, principal point, projection, distortion, polynomial distortion, tangential distortion, chromatic aberration, or additional lens characterization information.)
(908. The relative lens information is calculated, in part, based on information provided by sensors within a physical lens assembly.)
(909. The relative lens information is calculated, in part, based on the position of a focus ring.)
(910. The relative lens information is calculated, in part, based on the inputs provided to an auto-focus system.)
(911. The relative lens information is calculated, in part, based on a computational model of the optical lens assembly.)
(912. The computational model relates multiple parameters to each other.)
(913. Lens focus may be modified in response to changes to a selected focal length or focal distance.)
(914. The computational model can comprise any of: mathematical functions, look-up tables, or computer-executable instructions.)
(915. The computational model is operable to adjust any of: focal length, zoom, focal distance, principal point, distortion, polynomial distortion, tangential distortion, chromatic aberration, or other lens parameter.)
(916. The computational model is operable to adjust one or more lens parameters in response to changes to any of: focal length, zoom, focal distance, the focus ring, or any operator-controlled parameter, setting, or adjustment.)
(917. The computational model retains state over time.)
(918. The computational model comprises information about the previous state of the mechanical lens assembly in addition to its the current state.)
(919. The previous state is used to compensate for any of: mechanical slop, internal component flex, or imprecise position sensors.)
(920. The computational model is supplied at least in part by the lens manufacturer.)
(921. The computational model is configured by measuring an optical lens assembly in a variety of configurations.)
(922. The computational model is configured by executing a configuration sequence that employs motors within the lens assembly to sweep across a range of potential configurations.)
(923. The computational model is configured by observing any of: a reference object, or test pattern, an object of known dimensions, or an object with known properties.)
(924. Computational models for at least two lens assemblies may be mathematically combined to create a computational model for a combined lens assembly.)
(925. Any of the relative orientation information or the relative lens information are calculated based on inputs from sensors.)
(926. Any of the relative orientation information or the relative lens information are calculated based on analysis of the buddy camera images and the main camera images.)
(927. The reconstructing comprises any of: a ray tracing method, a ray casting method, a rasterization method, a 2D image manipulation method, triangle-based method, or a screen-space translation method.)
(928. The reconstructed frame buffer contains channels for any of: color information, intensity information, disparity information, depth information, confidence information, infrared information, object identification information, texture information, material information, lighting information, or additional information.)

FIG. 10 depicts aspects of a method for creating at least one depth buffer, in conjunction with an apparatus comprising at least two cameras, in accordance with an exemplary practice of the invention, as follows:

1000. Method for Creating at Least One Depth Buffer (Using at Least Two Cameras):
1001. Capture, through the at least two cameras, images corresponding to at least two substantially similar views of a scene;
1002. Rectify and un-distort the images into at least one common coordinate system;
1003. Compute at least one disparity solution based on the rectified and undistorted images; and
1004. Compute at least one buffer of depth values from the disparity solutions and the relative spatial positions of the cameras.

FIG. 11 depicts optional/additional elements of creating at least one depth buffer, in accordance with exemplary practices of the invention, as follows:

1100. Optional Aspects of Creating at Least One Depth Buffer:
(1101. Reconstructing a depth buffer from a virtual camera location within the common coordinate system.)
(1102. The virtual camera location corresponds to the location of a physical main camera.)
(1103. Elements of the computed depth buffer have a direct correspondence with pixel elements of a frame buffer of the main camera.)
(1104. At least one camera comprises relatively inexpensive camera modules such as a cell phone camera module.)
(1105. At least one of the cameras is a camera of high quality, with an adjustable lens.)
(1106. The rectification and un-distortion is performed based a computational model of a physical lens.)

FIG. 12 depicts a method of configuring a camera/imaging system in accordance with exemplary practices of the invention, as follows:

1200. Method of Configuring a Camera/Imaging System:
1201. Provide at least one main camera sensor operable to capture high quality images;

1202. Provide at least one adjustable main camera lens assembly operable to be configured by a camera operator;
1203. Provide at least one buddy camera sensor configured so as to have a perspective of a scene that is substantially similar to a perspective of the scene of the main camera;
1204. Provide at least one correspondence processing module, configured so that images from at least one buddy camera may be utilized as an input to a stereo correspondence search operation executable by the at least one correspondence processing module; and
1205. Provide at least one reconstruction processing module, configured to reconstruct at least one frame buffer from a selected viewpoint. (As noted elsewhere herein, the reconstruction processing module can be configured to reconstruct at least one frame buffer from a selected viewpoint. The selected viewpoint can be a viewpoint corresponding to the viewpoint of a main camera, or another viewpoint.)

FIG. 13 depicts optional/additional elements of configuring a camera/imaging system (for example, in addition to those depicted in FIG. 12 and discussed above), in accordance with exemplary practices and embodiments of the invention, as follows:

1300. Optional Aspects of Configuring Camera/Imaging System:
(1301. Operations of the at least one correspondence processing module and operations of the at least one reconstruction processing module are performed by the same processing resource.)
(1302. The reconstruction processing module reconstructs depth data.)
(1303. The system is further configured to merge a reconstructed frame buffer with a frame buffer captured from a main camera sensor.)
(1304. The at least one buddy camera sensor is an inexpensive camera sensor such as a cell phone camera module.)
(1305. The system comprises one main camera and an array of buddy cameras.)
(1306. The system comprises one main camera and one buddy camera.)
(1307. At least two buddy cameras are mounted together on a substantially rigid element.)
(1308. A configuration sequence can be executed to update any configuration information that may have become inaccurate in response to physical changes, mechanical shocks, environmental changes, or mechanical wear.)
(1309. The reconstructed data is displayed on an electronic viewfinder.)
(1310. Pre-visualization effects are displayed on an electronic viewfinder.)
(1311. An autofocus motor is controlled by an electronic system, the electronic system receiving depth information as an input parameter.)

FIG. 14 depicts further optional/additional elements of configuring a camera/imaging system (for example, in addition to those depicted in FIGS. 12 and 13 and discussed above), in accordance with exemplary practices and embodiments of the invention, as follows:

1400. Additional/Optional Aspects Of Configuring Camera/Imaging System:
(1401. At least one reconstruction processing module is configured to reconstruct at least one frame buffer from at least one viewpoint different from the selected viewpoint, from the same captured images.)
(1402. The selected viewpoint is a viewpoint corresponding to the viewpoint of a main camera.)
(1403. At least one viewpoint corresponds to a viewer's perspective as indicated by a viewing device.)
(1404. The viewing device is a head mounted display (HMD).)
(1405. The system comprises a storage resource operable to store any of captured image data, camera configuration data, image correspondence data, or deep frame buffer data useable in reconstruction of at least one frame buffer corresponding to at least one viewpoint different from the selected viewpoint.)
(1406. The system comprises a transmitting resource operable to transmit any of captured image data, camera configuration data, image correspondence data, or deep frame buffer data useable in reconstruction of at least one frame buffer in a location separate from that of the main camera sensor.)
(1407. At least one buddy camera sensor is a monochrome sensor.)
(1408. At least one buddy camera sensor does not utilize a Bayer filter or other color filter.)
(1409. At least one buddy camera sensor is sensitive to infrared (IR) light.)
(1410. At least one buddy camera sensor does not utilize an infrared (IR) or near-IR filter.)
(1411. The system comprises at least one infrared (IR) light emitter positioned to illuminate the scene and improve visibility of scene elements to at least one buddy camera.)
(1412. The system comprises shutter synchronization logic operable to synchronize capture of images by at least one buddy camera and at least one main camera.)
(1413. The shutter synchronization logic is responsive to a control signal from a master camera.)
(1414. The shutter synchronization logic is responsive to a common control signal.)
(1415. The shutter synchronization logic is responsive to at least one clock element.)
(1416. Clock elements are synchronized via a synchronization signal.)
(1417. The synchronization signal is generated by any of a network element, a GPS element, or other synchronization element.)
(1418. Clock elements are configured via a configuration signal.)
(1419. The configuration signal comprises configuration information.)
(1420. The configuration information comprises instructions to operate at least one shutter at a selected time interval.)
(1421. The configuration signal is generated by any of a network element, a GPS element, or other configuration element.)
(1422. Any of the control signal, synchronization signal or configuration signal are transmitted via a transmission medium.)
(1423. The transmission medium comprises any of a digital computer network, a WiFi network, a Bluetooth network, a radio signal, or a GPS signal.)
(1424. The system is operable to transmit a stream of frame buffer data via a communications connection, utilizing a selected transmission or streaming protocol.)
(1425. The stream is viewable on a selected viewing device.)
(1426. The viewing device comprises any of a smartphone, tablet computer, laptop computer, external monitor, or head mounted device (HMD).)
(1427. The communications connection comprises an analog communications medium.)
(1428. The communications connection comprises a digital network.)
(1429. The analog communications medium comprises radio transmission.)

(1430. The digital network comprises any of wired or wireless communications links.)
(1431. The system comprises focus adjustment logic operable to adjust focus in response to a change in lens zoom.)
(1432. At least one buddy camera is housed in association with a removable accessory structure selectively associatable with the main camera.)
(1433. The system comprises at least one image processing module operable to rectify and undistort, into the same common coordinate system, any of: images captured by a main camera and images captured by a buddy camera.)
(1434. Operations of the image processing module are responsive at least in part to a lens configuration of at least one main camera.)
(1435. The image processing module is configured to execute at least one computational operation corresponding to the computational inverse of a physical operation of at least one main camera lens.)
(1436. At least one correspondence processing module receives images captured by a main camera and images captured by a buddy camera.)
(1437. Computer generated (CG) effects are displayed on AN electronic viewfinder, and wherein the CG effects comprise any of CG characters, scene elements or backgrounds.)
(1438. Placeholder markers are displayed on the electronic viewfinder, to indicate where computer generated (CG) effects will subsequently be made visible to a subsequent viewer.)
(1439. Data from a reconstructed frame buffer is used to provide real-time feedback to a user of the system, and wherein the user is remote from the main camera.)
(1440. Computer generated (CG) effects are configured to be responsive to live actors, whose images are being captured by any of the main camera or at least one buddy camera, in real-time, using data from a reconstructed frame buffer.)
(1441. The electronic system that controls the autofocus motor seeks to focus at a selected focus depth.)
(1442. The electronic system that controls the autofocus motor comprises logic operable to anticipate the response of any of the autofocus motor or physical lens control elements.)
(1443. The system comprises at least one image processing module configured to identify at least one object within the image and control the autofocus electronic system to maintain a desired focus based on identification of the object.)
(1444. At least one object comprises a face, and the image processing module executes a facial recognition operation.)

Block Diagram(s) of Exemplary Embodiments of the Invention

Figure 15:
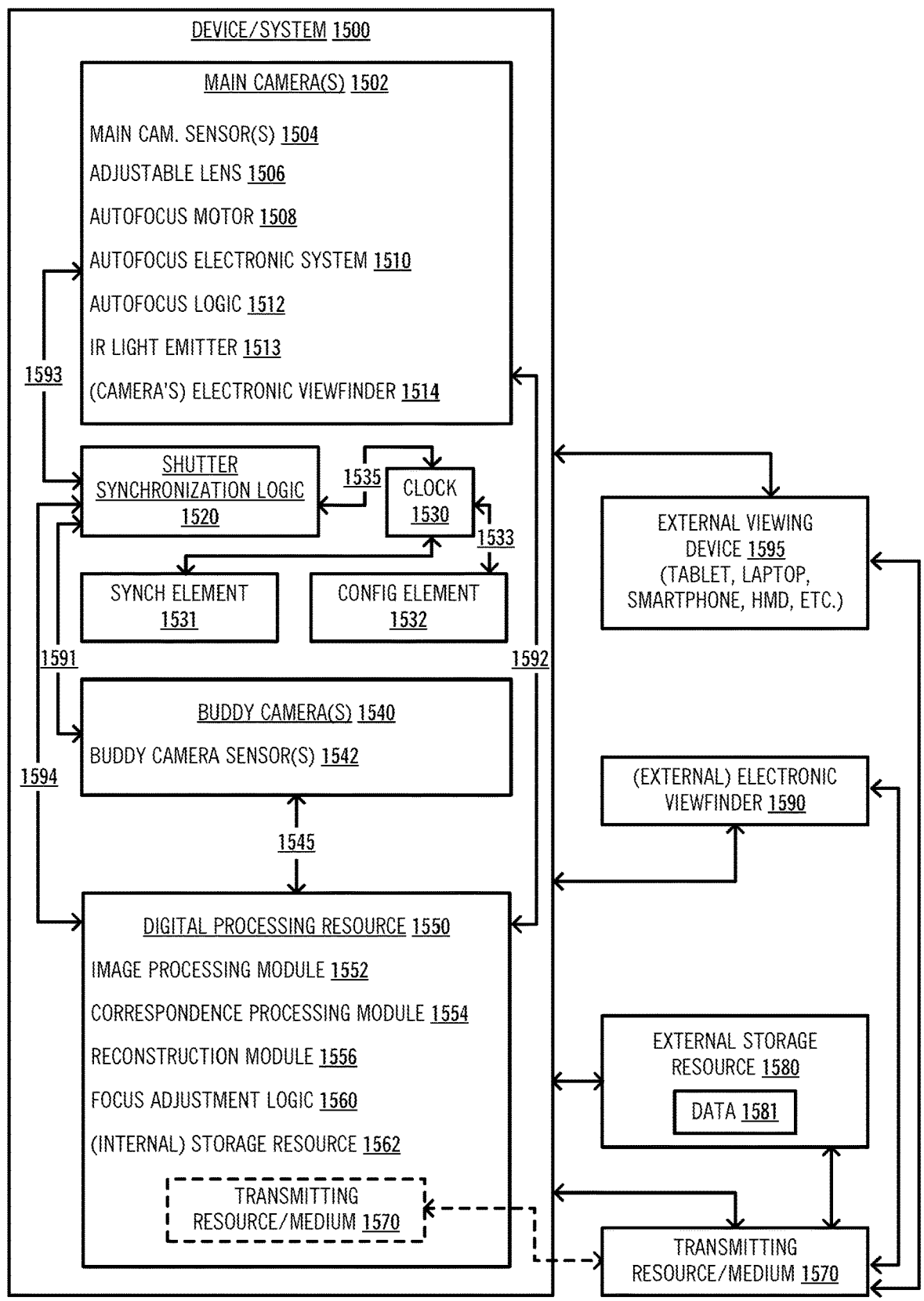
FIG. 15 is a schematic diagram depicting exemplary devices or systems in which aspects of the present invention may be practiced or embodied.

FIG. 15 is a schematic block diagram depicting exemplary devices or systems 1500 in which aspects of the present invention may be practiced or embodied. The device or system 1500 may be implemented using known forms of digital processing hardware, such as known forms of smartphones, tablets and/or other forms of digital processing and imaging devices, supplemented as necessary in accordance with the teachings of the present invention, and known forms of sensors and emitters, as described elsewhere in this document. Lines and arrows in FIG. 15 indicate exemplary flow of digital data and/or signals between elements.

By way of example, device or system 1500 can comprise at least the following elements: at least one main camera 1502 and at least one buddy camera (or multiples or arrays of buddy cameras) 1540 (which in turn comprise buddy camera sensor(s) 1542); shutter synchronization logic 1520 (which can be responsive to a control signal from a designated "master camera" to synchronize shutter functions across multiple cameras); clock element(s) 1530; synchronization element(s) 1531; configuration element(s) 1532; and digital processing resource(s) 1550.

The device or system 1500 can also comprise, or be in electronic communication with, at least the following elements: external viewing device(s) 1595 (which can comprise tablet computers, laptop computers, smartphones, head-mounted displays (HMD) or other external monitor or display devices): external electronic viewfinder(s) 1590, external storage resource(s) 1580 for storing and supplying data 1581, and at least one transmitting resource or medium 1570.

The main camera(s) 1502 can comprise at least the following elements: main camera sensor(s) 1504; at least one adjustable lens 1506; at least one autofocus motor 1508 for, e.g., adjusting the focus of adjustable lens 1506; an autofocus electronic system 1510 for controlling the autofocus motor(s) 1508 (and thus the lens(es) 1506); autofocus logic 1512 for controlling the autofocus electronic system 1510; at least one infra-red (IR) light emitter 1513 for providing IR illumination; and at least one electronic viewfinder 1514. (The main camera or cameras can also comprise an optical viewfinder element.)

The digital processing resource 1550 can comprise at least the following elements: image processing module(s) 1552; correspondence processing module(s) 1554; reconstruction module(s) 1556; focus adjustment logic 1560, (digital) storage resource(s) 1562; and transmitting resource(s)/medium 1570. (As indicated in FIG. 15, transmitting resource(s)/medium 1570 can be either (or both) internal and/or external to digital processing resource 1550.)

Signals and/or data are carried between main camera(s) 1502 and shutter synchronization logic 1520 on line 1593; between buddy camera(s) 1540 and shutter synchronization logic 1520 on line 1591; between digital processing resource(s) 1550 and shutter synchronization logic 1520 on line 1594; from synchronization element(s) 1531 to clock(s) 1530 on line 1535; from configuration element(s) 1532 to clock(s) 1530 on line 1533; between buddy camera(s) 1540 and digital processing resource(s) 1550 on line 1545; between main camera(s) 1502 and digital processing resource(s) 1550 on line 1592.

Exemplary operations of the foregoing elements, in connection with exemplary embodiments and practices of the invention, are described in greater detail elsewhere herein.

Those skilled in the art will understand that a number of the physical hardware and processing elements discussed in connection with FIG. 15 can be provided by structures found in commercially available smartphones, tablet computing devices, laptop computers, and other such devices, when configured and operated in accordance with exemplary practices of the present invention, and supplemented by additional hardware elements, such as additional cameras and/or other sensors, as may be required by the present invention.

The digital processor(s) of the digital processing resource, and the digital storage elements, can be of conventional design, such as those found in commercially available smartphones, tablet computing devices, and other such devices, when configured and operated in accordance with exemplary practices of the present invention.

In addition, the digital processors and storage elements described herein can be remote from each other, and remote from the camera(s) and/or other sensors, as such elements can be interconnected via digital communications networks.

It will be understood that a structure, device or system like that schematically depicted in FIG. 15 can contain all the elements of the invention depicted in the other drawing figures in this patent application and discussed herein.

FIG. 15 depicts merely an example of devices or systems in which aspects of the invention may be practiced or embodied. The invention may be practiced in connection with other forms of devices, systems or architectures, which may comprise more cameras, sensors or digital resources or pipelines, more or different processing resources or configurations of processing resources, or in which the various elements, modules, components, functions and processing resources may be distributed across multiple structures, systems, devices or processors, or across networks, instead of being contiguous or proximate.

Figure 16:
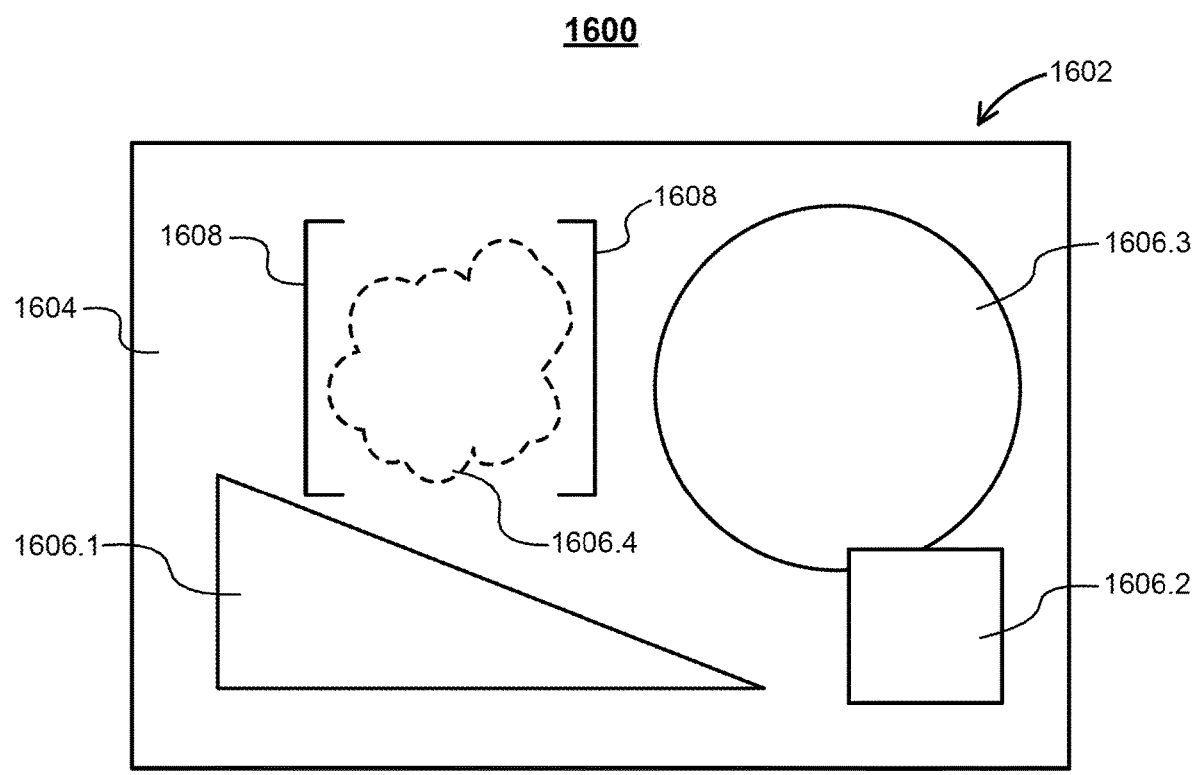
FIG. 16 is a schematic diagram depicting an electronic viewfinder and related features in accordance with exemplary embodiments of the invention.

FIG. 16 is a schematic diagram depicting an exemplary electronic viewfinder 1600 and associated features in accordance with exemplary practices and embodiments of the invention, including the use of placeholder markers, displayed in the visual field of the electronic viewfinder, to designate where computer generated (GG) effects may later be made visible to a subsequent viewer. As shown in FIG. 16, the viewfinder 1600 has a viewfinder field of view 1602, in which an exemplary scene 1604, containing exemplary scene objects 1606.1, 1606.2, 1606.3 and 1606.4, is displayed. Placeholder markers 1608 (in the example of FIG. 16, brackets 1608) are displayed to indicate to the viewer where CG effects will subsequently be made visible to a subsequent viewer.

CONCLUSION

While the foregoing description and the accompanying drawing figures provide details that will enable those skilled in the art to practice aspects of the invention, it should be recognized that the description is illustrative in nature and that many modifications and variations thereof will be apparent to those skilled in the art having the benefit of these teachings. It is accordingly intended that the invention herein be defined solely by any claims that may be appended hereto and that the invention be interpreted as broadly as permitted by the prior art.

We claim:

1. In an apparatus comprising a main camera and an array of buddy cameras, the main camera and the buddy cameras being operable to capture images, a method for creating a deep frame buffer, the method comprising:
   A. receiving at least two images from the array of buddy cameras;
   B. rectifying and un-distorting the at least two images received from the array of buddy cameras into at least one common coordinate system;
   C. computing at least one disparity solution based on the rectified and undistorted images;
   D. reconstructing a frame buffer utilizing parameter information, the parameter information comprising:
      (i) relative orientation information relating the main camera to the buddy camera array, and
      (ii) relative lens information relating the main camera lens configuration to the undistorted buddy camera images; and
   E. merging at least one reconstructed frame buffer with at least one frame buffer captured from a main camera.

2. The method of claim 1 wherein pixels in a reconstructed frame buffer have a correspondence with pixels in a main camera frame buffer.

3. The method of claim 1 wherein the reconstructed frame buffer comprises depth information.

4. The method of claim 1 further comprising executing additional image effects, the effects comprising any of: compositing, layer separation, computational focus change, perspective change, image filtering, post production effects, or a combination of effects.

5. The method of claim 1 wherein the relative orientation information comprises any of: spatial position, rotation, coordinate scale, spatial translation, projection information, or additional transformation information.

6. The method of claim 1 wherein the relative orientation information is calibrated in advance of system operation.

7. The method of claim 1 wherein the relative lens information comprises a selected combination of lens type, focal length, focal distance, principal point, projection, distortion, polynomial distortion, tangential distortion, chromatic aberration, or additional lens characterization information.

8. The method of claim 1 wherein the relative lens information is calculated, in part, based on any of information provided by sensors within a physical lens assembly, the position of a focus ring, or the inputs provided to an auto-focus system.

9. The method of claim 1 wherein lens focus may be modified in response to changes to a selected focal length or focal distance.

10. The method of claim 1 wherein the relative lens information is calculated, in part, based on a computational model of the optical lens assembly.

11. The method of claim 10 wherein the computational model is operable to adjust any of: focal length, zoom, focal distance, principal point, distortion, polynomial distortion, tangential distortion, chromatic aberration, or other lens parameter.

12. The method of claim 10 wherein the computational model is operable to adjust one or more lens parameters in response to changes to any of: focal length, zoom, focal distance, the focus ring, or any operator-controlled parameter, setting, or adjustment.

13. The method of claim 10 wherein the computational model is configured by measuring an optical lens assembly in a variety of configurations.

14. The method of claim 10 wherein the computational model is configured by executing a configuration sequence that employs motors within the lens assembly to sweep across a range of potential configurations.

15. The method of claim 10 wherein the computational model is configured by observing any of: a reference object, or test pattern, an object of known dimensions, or an object with known properties.

16. The method of claim 1 wherein any of the relative orientation information or the relative lens information are calculated based on inputs from sensors.

17. The method of claim 1 wherein any of the relative orientation information or the relative lens information are calculated based on analysis of the buddy camera images and the main camera images.

18. The method of claim 1 wherein the reconstructed frame buffer contains channels for any of: color information, intensity information, disparity information, depth information, confidence information, infrared information, object identification information, texture information, material information, lighting information, or additional information.

19. A system operable to create a deep frame buffer, the system comprising:
  a main camera and an array of buddy cameras, the main camera and the buddy cameras being operable to capture images; and
  a digital processing resource comprising at least one digital processor, the digital processing resource being operable to:
  A. receive at least two images from the array of buddy cameras;
  B. rectify and un-distort the at least two images received from the array of buddy cameras into one or more common coordinate systems;
  C. compute at least one disparity solution based on the rectified and undistorted images;
  D. reconstruct a frame buffer utilizing parameter information, the parameter information comprising:
    (i) relative orientation information relating the main camera to the buddy camera array, and
    (ii) relative lens information relating the main camera lens configuration to the undistorted buddy camera images; and
  E. merge at least one reconstructed frame buffer with at least one frame buffer captured from a main camera.

20. A non-transitory digital processor-readable medium useable in a digital processing system, the digital processing system comprising at least one digital processor and operable to receive images from an apparatus comprising a main camera and an array of buddy cameras, the main camera and the buddy cameras being operable to capture images, the digital processor-readable medium comprising digital processor-executable program instructions, which, when executed in the digital processing system, cause the digital processing system to:
  execute a method for creating a deep frame buffer, the method comprising:
  A. receiving at least two images from the array of buddy cameras;
  B. rectifying and un-distorting the at least two images received from the array of buddy cameras into at least one common coordinate system;
  C. computing at least one disparity solution based on the rectified and undistorted images;
  D. reconstructing a frame buffer utilizing parameter information, the parameter information comprising:
    (i) relative orientation information relating the main camera to the buddy camera array, and
    (ii) relative lens information relating the main camera lens configuration to the undistorted buddy camera images; and
  E. merging at least one reconstructed frame buffer with at least one frame buffer captured from a main camera.

* * * * *